(12) United States Patent
Osada et al.

(10) Patent No.: US 12,545,145 B2
(45) Date of Patent: Feb. 10, 2026

(54) STORAGE BATTERY MANAGEMENT SYSTEM, VEHICLE, AND SERVER DEVICE

(71) Applicant: SEMICONDUCTOR ENERGY LABORATORY CO., LTD., Atsugi (JP)

(72) Inventors: Takeshi Osada, Kanagawa (JP); Noboru Inoue, Kanagawa (JP); Haruki Katagiri, Kanagawa (JP); Yosuke Tsukamoto, Kanagawa (JP); Mayumi Mikami, Kanagawa (JP); Kazuki Tanemura, Kanagawa (JP); Kousuke Sasaki, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 198 days.

(21) Appl. No.: 18/551,561

(22) PCT Filed: Mar. 11, 2022

(86) PCT No.: PCT/IB2022/052187
§ 371 (c)(1),
(2) Date: Sep. 20, 2023

(87) PCT Pub. No.: WO2022/200907
PCT Pub. Date: Sep. 29, 2022

(65) Prior Publication Data
US 2025/0065776 A1    Feb. 27, 2025

(30) Foreign Application Priority Data

Mar. 26, 2021  (JP) .................................. 2021-052939
Apr. 9, 2021    (JP) .................................. 2021-066429
Jan. 7, 2022    (JP) .................................. 2022-001612

(51) Int. Cl.
*B60L 58/22* (2019.01)
*B60L 50/60* (2019.01)
(Continued)

(52) U.S. Cl.
CPC ............... *B60L 58/22* (2019.02); *B60L 50/60* (2019.02); *B60L 58/12* (2019.02);
(Continued)

(58) Field of Classification Search
CPC ....... H02J 7/0014; H02J 7/005; B60L 53/665; B60L 50/66; H01M 50/271; H01M 10/48; G01R 31/382
See application file for complete search history.

(56) References Cited

U.S. PATENT DOCUMENTS 9,979,210 B2    5/2018  Takao
10,162,010 B2   12/2018 Zhang
(Continued)

FOREIGN PATENT DOCUMENTS

CN    105706330 A    6/2016
CN    107003357 A    8/2017
(Continued)

OTHER PUBLICATIONS

International Search Report (Application No. PCT/IB2022/052187) Dated May 17, 2022.
(Continued)

*Primary Examiner* — Yuri Kan
(74) *Attorney, Agent, or Firm* — Fish & Richardson P.C.

(57) ABSTRACT

A system is provided with which data on the internal state of a storage battery such as SOC-OCV characteristics and FCC can be obtained with high accuracy and highly accurate estimation is possible even in the case of repeating charging and discharging for a long period. The storage battery management system includes a vehicle that includes a unit
(Continued)

enabling data transmission and reception; the vehicle includes a storage battery, a balancing circuit electrically connected to the storage battery, and a vehicle control unit having a function of controlling the balancing circuit; the storage battery includes an assembled battery including a plurality of battery cells; the vehicle control unit has a function of selecting an estimated value that most closely shows a state of each of the battery cells included in the assembled battery; and the balancing circuit has a function of being controlled in accordance with the selected estimated value.

19 Claims, 19 Drawing Sheets

(51) Int. Cl.
| | |
|---|---|
| *B60L 58/12* | (2019.01) |
| *G07C 5/00* | (2006.01) |
| *H01M 10/42* | (2006.01) |
| *H01M 50/209* | (2021.01) |
| *H01M 50/211* | (2021.01) |
| *H01M 50/213* | (2021.01) |
| *H02J 7/00* | (2006.01) |

(52) U.S. Cl.
CPC ....... *H01M 10/425* (2013.01); *H01M 50/209* (2021.01); *H01M 50/211* (2021.01); *H01M 50/213* (2021.01); *H02J 7/0014* (2013.01); *G07C 5/008* (2013.01); *H01M 2010/4271* (2013.01); *H01M 2010/4278* (2013.01); *H01M 2220/20* (2013.01)

(56) References Cited

U.S. PATENT DOCUMENTS

| | | | |
|---|---|---|---|
| 11,340,306 B2 | 5/2022 | Isa et al. | |
| 11,480,621 B2 | 10/2022 | Tajima et al. | |
| 2009/0198399 A1* | 8/2009 | Kubo | H02J 7/00309 701/22 |
| 2016/0218525 A1* | 7/2016 | Takao | H02J 7/005 |
| 2017/0328956 A1* | 11/2017 | Zhang | B60L 50/66 |
| 2020/0408845 A1* | 12/2020 | Horii | H01M 10/48 |
| 2021/0055352 A1* | 2/2021 | Takahashi | G01R 31/382 |
| 2022/0179007 A1 | 6/2022 | Chida et al. | |
| 2022/0260643 A1 | 8/2022 | Saito et al. | |
| 2023/0261331 A1* | 8/2023 | Morton | H01M 50/271 429/163 |
| 2023/0365025 A1* | 11/2023 | Cao | B60L 53/665 |

FOREIGN PATENT DOCUMENTS

| | | |
|---|---|---|
| CN | 111788492 A | 10/2020 |
| EP | 3224632 A | 10/2017 |
| EP | 3916884 A | 12/2021 |
| JP | 2013-085363 A | 5/2013 |
| JP | 2015/072061 | 3/2017 |
| JP | 2017-538935 | 12/2017 |
| JP | 2020-119658 A | 8/2020 |
| JP | 2019/175707 | 3/2021 |
| JP | 2022-062772 A | 4/2022 |
| KR | 2017-0092552 A | 8/2017 |
| WO | WO-2013/051688 | 4/2013 |
| WO | WO-2015/072061 | 5/2015 |
| WO | WO-2016/082208 | 6/2016 |
| WO | WO-2019/175707 | 9/2019 |
| WO | WO-2019/193471 | 10/2019 |

OTHER PUBLICATIONS

Written Opinion (Application No. PCT/IB2022/052187) Dated May 17, 2022.

* cited by examiner

| bit data | Corresponding SOC [%] |
|---|---|
| 0000 | −10 % |
| 0001 | 0 % |
| 0010 | 20 % |
| 0011 | 40 % |
| 0100 | 60 % |
| 0101 | 80 % |
| 0110 | 90 % |
| 0111 | 95 % |
| 1000 | 97 % |
| 1001 | 98 % |
| 1010 | 99 % |
| 1011 | 100 % |
| 1100 | 101 % |
| 1101 | 102 % |
| 1110 | State A |
| 1111 | State B |

| bit data | Corresponding voltage [V] |
|---|---|
| 0000 | 2.550 V |
| 0001 | 2.700 V |
| 0010 | 3.000 V |
| 0011 | 3.300 V |
| 0100 | 3.600 V |
| 0101 | 3.900 V |
| 0110 | 4.050 V |
| 0111 | 4.125 V |
| 1000 | 4.155 V |
| 1001 | 4.170 V |
| 1010 | 4.185 V |
| 1011 | 4.200 V |
| 1100 | 4.215 V |
| 1101 | 4.230 V |
| 1110 | State C |
| 1111 | State D |

162

STORAGE BATTERY MANAGEMENT SYSTEM, VEHICLE, AND SERVER DEVICE

CROSS REFERENCE TO RELATED APPLICATIONS

This application is a U.S. National Phase Application under 35 U.S.C. § 371 of International Application PCT/IB2022/052187, filed on Mar. 11, 2022, which is incorporated by reference and claims the benefit of foreign priority applications filed in Japan on Mar. 26, 2021, as Application No. 2021-052939, on Apr. 9, 2021, as Application No. 2021-066429, and on Jan. 7, 2022, as Application No. 2022-001612.

TECHNICAL FIELD

One embodiment of the present invention relates to a storage battery management system. Furthermore, one embodiment of the present invention relates to a server device or a computer program used for the storage battery management system. One embodiment of the present invention relates to a storage battery management system using a neural network.

One embodiment of the present invention relates to a vehicle incorporating a storage battery management system. Another embodiment of the present invention relates to an electronic device incorporating a storage battery management system. Furthermore, one embodiment of the present invention is not limited to a vehicle and an electronic device, and relates to a power storage device for storing electric power obtained from power generation facilities such as solar power generation panels.

Note that one embodiment of the present invention is not limited to the above technical field, and relates to a semiconductor device, a display device, a light-emitting device, a recording device, a driving method thereof, or a manufacturing method thereof. Therefore, the technical field of one embodiment of the invention disclosed in this specification and the like relates to an object, a method, or a manufacturing method.

BACKGROUND ART

Storage batteries typified by lithium-ion secondary batteries are essential for a modern society as energy sources that can be used repeatedly. Lithium-ion secondary batteries have high output and high energy density; on the other hand, the lithium-ion secondary batteries are known to be highly risky in terms of safety against overdischarging and overcharging. Therefore, in the case of using lithium-ion secondary batteries, it is required to grasp or manage internal states of the batteries such as the state of charge and the internal resistance.

As an estimation method for grasping the internal state, a coulomb counting method, an open circuit voltage (OCV) method, or a Kalman filter are known (e.g., see Patent Document 1). In the estimation method such as a Kalman filter, it is important to obtain highly accurate data on the internal state of a storage battery, e.g., state of charge (SOC)-OCV characteristics and full charge capacity (FCC).

REFERENCE

Patent Document

[Patent Document 1] PCT International Publication No. WO2019/193471 Pamphlet

SUMMARY OF THE INVENTION

Problems to be Solved by the Invention

Although not considered in Patent Document 1 above, when charging and discharging are repeated for a long period, deterioration occurs in a storage battery in some cases. Furthermore, errors are accumulated in measured values of the storage battery in some cases. As a result, the accuracy of data on the internal state such as SOC-OCV characteristics and FCC might be lowered. Managing the storage battery with low accuracy of data on the internal state might lower the estimation accuracy, and thus hasten the deterioration of the storage battery or lead the storage battery to a dangerous state.

For example, a large amount of data is desirably obtained for highly accurate SOC-OCV characteristic data. Obtaining a large amount of data includes collecting an amount of data with the passage of time. However, when the amount of data, which is utilized by a control portion or a memory portion of a storage battery, a vehicle including the storage battery, or the like, is large, the data capacity that can be handled might be exceeded, and arithmetic operation capability might be deficient. The estimation processing or the like under the above situation takes time, and the estimation accuracy might be lowered.

Therefore, an object of one embodiment of the present invention is to provide a storage battery management system, a vehicle, or a server device that enables a highly accurate estimation regarding the internal state of a storage battery such as SOC-OCV characteristics and FCC even when charging and discharging are repeated for a long period.

An object of one embodiment of the present invention is to provide a system or a method that enables an estimation regarding the above storage battery to be performed with high accuracy in a short time.

Note that the description of these objects does not preclude the existence of other objects. One embodiment of the present invention does not need to achieve all the objects. Note that other objects can be derived from the description of the specification, the drawings, the claims, and the like (referred to as this specification and the like).

Means for Solving the Problems

One embodiment of the present invention is a storage battery management system including a vehicle that includes a unit enabling data transmission and reception: the vehicle includes a storage battery, a balancing circuit electrically connected to the storage battery, and a vehicle control unit having a function of controlling the balancing circuit: the storage battery includes an assembled battery including a plurality of battery cells: the vehicle control unit has a function of selecting an estimated value that most closely shows a state of each of the battery cells included in the assembled battery; and the balancing circuit has a function of being controlled in accordance with the selected estimated value.

One embodiment of the present invention is a storage battery management system including a server device and a vehicle that includes a unit enabling data transmission and reception with the server device: the vehicle includes a storage battery, a balancing circuit electrically connected to the storage battery, and a vehicle control unit having a function of controlling the balancing circuit: the storage battery includes an assembled battery including a plurality of battery cells: the server device has a function of calculating at least two or more estimated values in accordance with first data on an internal state of the assembled battery that is transmitted from the vehicle, and a function of transmitting the two or more estimated values to the vehicle: the vehicle control unit has a function of selecting an estimated value that most closely shows a state of each of the battery cells included in the assembled battery from the two or more estimated values; and the balancing circuit has a function of being controlled in accordance with the selected estimated value.

In the storage battery management system described in any one of the above, the first data preferably includes successive data on the internal state of the assembled battery.

In the storage battery management system described in any one of the above, the successive data preferably includes an SOC-OCV characteristic.

In the storage battery management system described in any one of the above, the successive data preferably includes internal resistance.

In the storage battery management system described in any one of the above, the internal resistance preferably includes a resistance component R1 with a high response speed and a resistance component R2 with a low response speed.

In the storage battery management system described in any one of the above, the server device preferably has a function of predicting changes in the resistance component R1 with a high response speed and the resistance component R2 with a low response speed with LSTM (Long Short-Term Memory)

One embodiment of the present invention is a vehicle including a storage battery, a balancing circuit electrically connected to the storage battery, and a vehicle control unit having a function of controlling the balancing circuit; the storage battery includes an assembled battery including a plurality of battery cells: the vehicle control unit has a function of selecting an estimated value that most closely shows a state of each of the battery cells included in the assembled battery from two or more estimated values transmitted from the server device; and the balancing circuit has a function of being controlled in accordance with the selected estimated value.

In the vehicle described in any one of the above, the server device preferably has successive data on an internal state of the assembled battery that is transmitted from the vehicle. In the vehicle described in any one of the above, the successive data preferably includes an SOC-OCV characteristic.

In the vehicle described in any one of the above, the successive data preferably includes internal resistance In the vehicle described in any one of the above, the internal resistance preferably includes a resistance component R1 with a high response speed and a resistance component R2 with a low response speed.

In the vehicle described in any one of the above, the internal resistance preferably includes a measured value of each of the plurality of battery cells.

The vehicle described in any one of the above preferably has a function of measuring the internal resistance by a current-rest-method.

One embodiment of the present invention is a server device having a function of receiving first data on an internal state of a battery cell included in an assembled battery that is transmitted from a vehicle including the assembled battery, a function of calculating at least two or more estimated values using the first data and a first algorithm, and a function of transmitting the two or more estimated values to the vehicle.

In the server device described in any one of the above, the first data preferably includes successive data on an internal state of the assembled battery.

In the server device described in any one of the above, the successive data preferably includes an SOC-OCV characteristic.

In the server device described in any one of the above, the successive data preferably includes internal resistance.

In the server device described in any one of the above, the internal resistance preferably includes a resistance component R1 with a high response speed and a resistance component R2 with a low response speed.

The server device described in any one of the above preferably has a function of predicting changes in the resistance component R1 with a high response speed and the resistance component R2 with a low response speed with LSTM.

Effect of the Invention

According to the present invention, estimation processing regarding an internal state of a storage battery can be performed with high accuracy in a short time. Note that even when the storage battery includes an assembled battery, estimation processing regarding the internal state of the storage battery can be performed with high accuracy in a short time.

Note that the description of these effects does not preclude the existence of other effects. One embodiment of the present invention does not need to have all of these effects. Note that other effects will be apparent from the description of the specification, the drawings, the claims, and the like and other effects can be derived from the description of the specification, the drawings, the claims, and the like.

MODE FOR CARRYING OUT THE INVENTION

Examples of embodiments of the present invention will be described in detail below with reference to the drawings and the like. Note that the present invention should not be interpreted as being limited to the examples of embodiments given below. Embodiments of the invention can be changed unless it deviates from the spirit of the present invention.

In this specification and the like, the Miller index is used for the expression of crystal planes and crystal orientations. An individual plane that shows a crystal plane is denoted by "( )". In the crystallography, a bar is placed over a number in the expression of crystal planes, crystal orientations, and space groups: in this specification and the like, because of format limitations, crystal planes, crystal orientations, and space groups are sometimes expressed by placing "−" (a minus sign) in front of the number instead of placing a bar over the number.

In this specification and the like, a theoretical capacity of a positive electrode active material refers to the amount of electricity obtained when all lithium that can be inserted and extracted and is contained in the positive electrode active material is extracted. For example, the theoretical capacity of $LiCoO_2$ is 274 mAh/g, the theoretical capacity of $LiNiO_2$ is 275 mAh/g, and the theoretical capacity of $LiMn_2O_4$ is 148 mAh/g.

Note that in this specification and the like, a storage battery refers to every element and device having a function of storing power. For example, a secondary battery such as a lithium-ion secondary battery, a lithium-ion capacitor, and an electric double layer capacitor are included in the category of the storage battery.

In this specification and the like, a power storage device includes a device for storing electric power obtained from power generation facilities such as a solar power generation panel.

Electronic devices in this specification and the like mean all devices including storage batteries, and electro-optical devices including storage batteries, information terminal devices including storage batteries, and the like are all electronic devices.

In this specification and the like, a semiconductor device means an element, a circuit, a device, or the like that can function by utilizing semiconductor characteristics. For example, a semiconductor element such as a transistor or a diode is a semiconductor device. For another example, a circuit including a semiconductor element is a semiconductor device. For another example, a device provided with a circuit including a semiconductor element is a semiconductor device.

Embodiment 1

In this embodiment, a storage battery management system of one embodiment of the present invention is described.

Figure 1A:
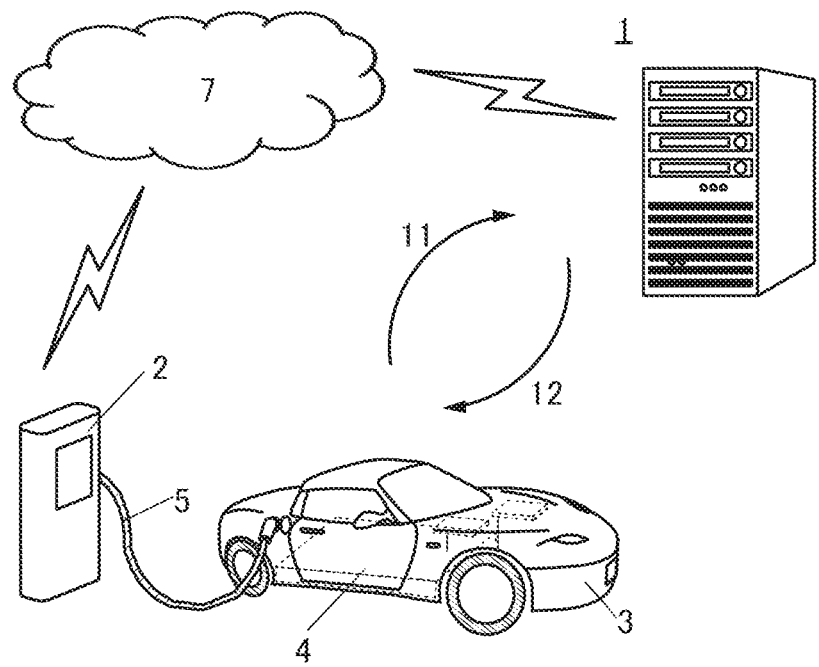
FIG. 1A and FIG. 1B are conceptual views of a storage battery management system of one embodiment of the present invention.
Figure 1B:
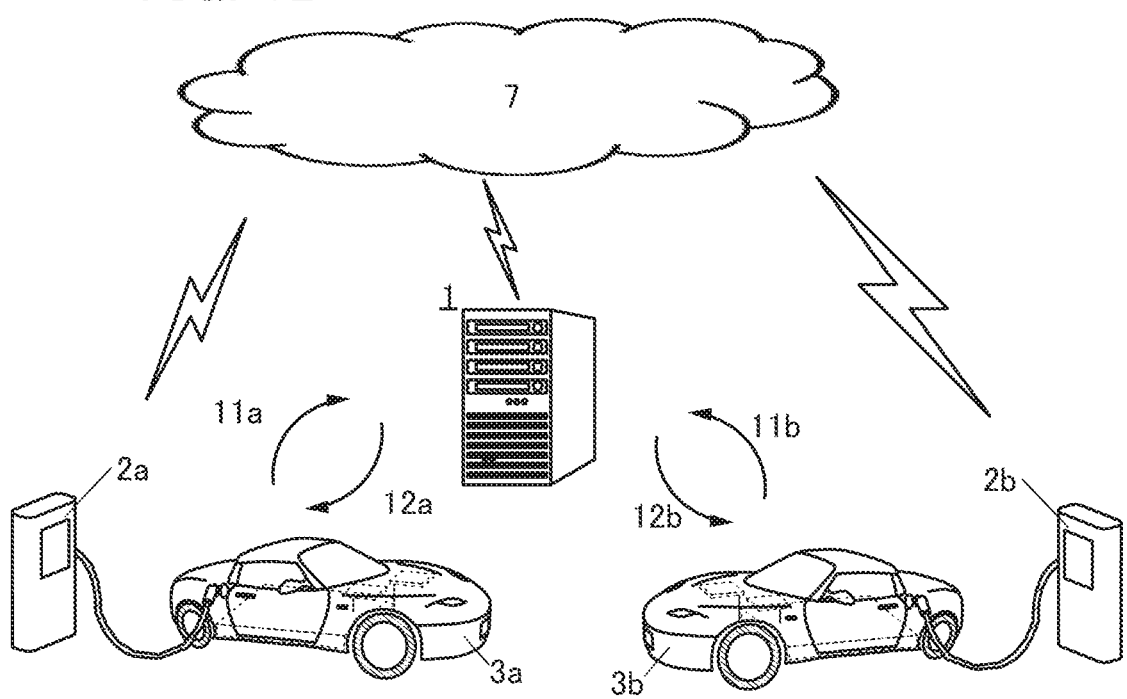

FIG. 1A and FIG. 1B are conceptual views of a storage battery management system. The storage battery management system includes a server device 1, a storage battery pack (also referred to as a battery pack) 4 including a plurality of battery cells, and a vehicle 3 that includes a unit enabling data transmission and reception with the server device 1. In this storage battery management system, the estimation of the internal state of each of the battery cells can be executed in the server device 1, and the vehicle 3 can receive the execution results. That is, the server device 1 can execute the estimation of the internal state of the battery cell that has been conventionally performed in the vehicle 3. In order to make the server device 1 execute the estimation regarding the internal state of the battery cell, data on the internal state of the battery cell (including measured data or estimated data) is preferably transmitted from the vehicle 3 to the server device 1 successively. The successively transmitted data is referred to as successive data in some cases. The successive data increases the amount of data: however, the data is recorded, i.e., stored, in the server device 1, and there is no burden on a memory portion in the vehicle 3. The data estimated by the server device 1 in accordance with the successive data (sometimes referred to as an estimated value) desirably exists two or more pieces for each battery cell. Since the server device 1 executes the estimation processing, the estimation processing can be performed also during running and time can be spent on the estimation processing; and even in view of the arithmetic capacity of the server device 1, two or more estimated values can be calculated. After that, the two or more estimated values are transmitted from the server device 1 to the vehicle 3, and the vehicle 3 can select the optimal one from the two or more estimated values. The vehicle 3 does not perform the estimation processing and selects the received estimated value. Note that the estimated value that is not selected sometimes includes an error that causes the vehicle 3 to make such determination. The vehicle 3 can return a plurality of pieces of information regarding the selected estimated value, the non-selected estimated value, and the error to the server device 1. With such a system, estimation processing regarding an internal state of a storage battery can be performed with high accuracy in a short time. Furthermore, as the estimated value transmission and reception between the server device 1 and the vehicle 3 are repeated a plurality of times, the estimated value accuracy is improved, which is preferable.

The battery cell can measure current, voltage, and temperature using a sensor or the like included in the vehicle 3. For example, the current of the battery cell can be measured as an accumulated value by coulomb counting. The internal state of the battery cell can be estimated utilizing these measured values. The estimation of the internal state includes the estimation of SOC-OCV characteristics, the estimation of FCC, or the estimation of internal resistance (R). When the SOC-OCV characteristics are estimated, the storage battery management system can be referred to as an SOC estimation system of the storage battery.

The server device 1 can execute any one or two or more of the above estimations of the internal state. The estimation not executed in the server device 1 may be executed in the vehicle 3. For example, the estimation of internal resistance (R) that has small burden of the volume of data may be executed in the vehicle 3.

FIG. 1B is a conceptual view of the case where the storage battery management system is used by a plurality of vehicles. The kinds of the plurality of vehicles may be the same or different from each other.

The server device 1 preferably has a function of a cloud server, an AI (Artificial Intelligence) server, a GPU (Graphics Processing Unit) server, or the like. The server device 1 preferably includes an algorithm with a neural network, and the storage battery management system can be referred to as a storage battery management system with artificial intelligence. Other than the GPU, a CPU (Central Processing Unit) is preferably included. The GPU or the CPU enables high-speed arithmetic processing.

The storage battery pack 4 includes the plurality of battery cells (what is called an assembled battery). Since the battery pack 4 includes the plurality of battery cells, the amount of successive data on the internal states becomes huge. However, in one embodiment of the present invention, the data can be recorded, i.e., stored, in the server device 1. Furthermore, the server device 1 can execute estimation processing in accordance with the data, and thus there is no burden on a control portion or the memory portion in the vehicle 3, which is preferable.

The server device 1 can transmit and receive data to/from the vehicle 3 through a communication network 7. That is, the server device 1 and the vehicle 3 each include a communication unit for the communication network 7. The data transmission and reception can be performed at a given timing and are preferably performed in charging of the vehicle 3. It is preferable that in charging, the server device 1 execute the estimation processing and transmit and receive the estimated value.

Data communication between the server device 1 and the vehicle 3 is not limited to one to one direct data communication, and may be data communication through a charger 2, an electronic device (including a battery device owned by a passenger), an Internet line, a communication relay device, a communication base station, or the like. As a data communication system of the communication network 7, wired communication or wireless communication may be used. In the case of using wireless communication, wireless communication conforming to the communication standard such as the fourth-generation mobile communication system (4G) or the fifth-generation mobile communication system (5G) can be used, for example. The signal frequency of the wireless communication can be any of the following frequencies, for example: 300 GHz to 3 THz of sub-millimeter waves: 30 GHz to 300 GHz of millimeter waves: 3 GHz to 30 GHz of microwaves: 300 MHz to 3 GHz of ultra high frequencies: 30 MHz to 300 MHz of very high frequencies: 3 MHz to 30 MHz of high frequencies: 300 kHz to 3 MHz of medium frequencies: 30 kHz to 300 kHz of low frequencies; and 3 kHz to 30 kHz of very low frequencies.

For the data transmission and reception, the charger 2 may include the above communication unit conformable to the communication network 7.

As illustrated in FIG. 1A and FIG. 1B, data includes first data 11 that is transmitted from the vehicle 3 to the server device 1 and second data 12 that is transmitted from the server device 1 to the vehicle 3.

The first data 11 relates to the battery cell included in the storage battery pack 4, and includes data measured by the sensor in the vehicle 3 or data estimated in accordance with the measured data. The kinds of data on the storage battery pack 4 include FCC, internal resistance (R), and SOC-OCV characteristic data. Furthermore, an accumulated charge amount may be included as the data. The accumulated charge amount of the storage battery pack 4 refers to either one or both of the charge amount accumulated since the storage battery pack 4 is mounted on the vehicle 3 and the charge amount accumulated since the last data transmission. In the case where the accumulated charge amount refers to both of them, two kinds of data show the accumulated charge amount of the storage battery pack 4. The first data 11 includes error data in some cases.

The second data 12 relates to the storage battery pack 4, and includes estimated data (an estimated value). Note that the kinds of estimated value regarding the storage battery pack 4 include FCC, an internal resistance (R) value, SOC-OCV characteristic data, and an accumulated charge amount.

The estimated second data 12 desirably includes two or more estimated values, e.g., estimated SOC-OCV characteristic data A and estimated SOC-OCV characteristic data B. In this case, the vehicle 3 can select any one of the data A and the data B as an estimated value of SOC-OCV of the storage battery pack 4, and balancing processing according to the need is performed using the estimated value.

The first data 11 and the second data 12 can be transmitted and received between the server device 1 and the vehicle 3 not through the charger 2, and the vehicle 3 preferably includes a communication unit.

In FIG. 1B, a plurality of pieces of first data (first data 11a and second data 11b) that are transmitted from a plurality of chargers (a first charger 2a and a second charger 2b) and a plurality of vehicles (a first vehicle 3a and a second vehicle 3b) to the server device 1 and a plurality of pieces of second data (second data 12a and second data 12b) that are transmitted from the server device 1 to each of the plurality of chargers and the plurality of vehicles are included. The server device 1 can communicate the plurality of pieces of first data and the plurality of pieces of second data at the same time.

Although FIG. 1B illustrates the plurality of chargers, the storage battery management system of the present invention can be used even when a plurality of vehicles are charged with one charger.

The storage battery management system of the present invention may be used after a passenger is registered. Vehicle information can be also registered when the passenger is registered, and the vehicle information can be grasped in advance. The vehicle information includes data on initial values, and the kinds of data on the initial values regarding the storage battery pack 4 include an internal resistance (R) value, SOC-OCV characteristic data, FCC, and the like. The initial values can be grasped at the timing when aging of the storage battery pack or the vehicle is performed before shipment.

Figure 2:
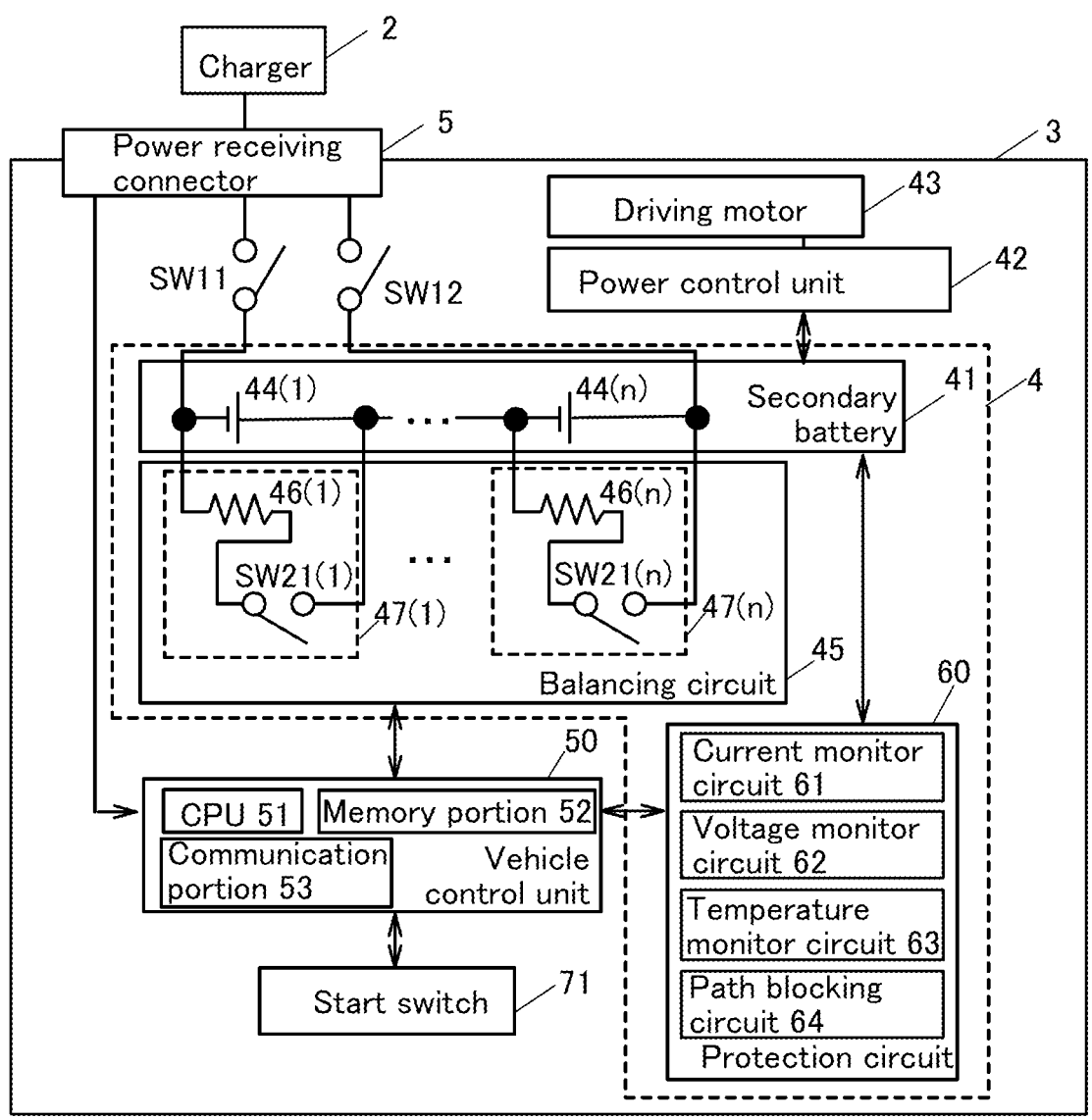
FIG. 2 is a conceptual view of a vehicle of one embodiment of the present invention.

FIG. 2 shows a detailed structure example of the vehicle 3. The vehicle 3 includes a power receiving connector 5, and charging can be performed by inserting the power receiving connector 5 in the charger 2. The charger 2 includes a power receiving connector in some cases. The charger 2 is provided at home, a charge station, a public parking lot, or the like. The vehicle 3 is configured as a plug-in hybrid electric vehicle, EV vehicle, or industrial vehicle such as an electric forklift in which the storage battery pack 4 can be charged with electric power from the charger 2.

As illustrated in FIG. 2, the storage battery pack 4 includes a storage battery (secondary battery) 41. The secondary battery 41 includes an assembled battery including a plurality of battery cells. In the case where a carrier ion of the secondary battery 41 is a lithium ion, the secondary battery is referred to as a lithium-ion secondary battery. Furthermore, a nickel-hydrogen battery may be used as the secondary battery 41. The storage battery pack 4 is referred to as a battery in some cases.

The secondary battery 41 is electrically connected to the power receiving connector 5 at least through a first switch SW11 and a second switch SW12. The first switch SW11 is electrically connected to a negative electrode terminal of the secondary battery 41, and the second switch SW12 is electrically connected to a positive electrode terminal of the secondary battery 41.

A power control unit 42 is electrically connected to the secondary battery 41, and a driving motor 43 is electrically connected to the power control unit 42. The power control unit 42 has a function of converting DC power supplied from the secondary battery 41 into AC power and outputting the AC power to the driving motor 43. The power control unit 42 includes an inverter circuit that can perform the above conversion, for example.

The power control unit 42 may further have a function of, when the vehicle 3 decelerates or stops, converting AC power generated by the driving motor 43 into DC power and outputting the DC power to the secondary battery 41. That is, regenerative power generated by the driving motor 43 may be stored in the secondary battery 41.

The assembled battery included in the secondary battery 41 includes a plurality of battery cells 44(1) to 44(n) (note that n is a natural number greater than or equal to 2), and the plurality of battery cells are connected to each other in series. The determination of a cell balance state in the assembled battery is performed in charging, and when the cell balancing is determined to be lost, balancing processing is performed. The balancing processing preferably terminates in charging with the use of SOC estimation for each battery cell.

In the balancing processing, the estimation of the SOC-OCV characteristics is important. The estimated values of the SOC-OCV characteristics are preferably transmitted as tables from the server device 1, and the vehicle 3 can select the SOC-OCV characteristics optimal for an actual assembled battery from the tables, create a table for the vehicle 3, and complete the SOC-OCV characteristics estimation. The creation of the table for the vehicle 3 may be achieved using a method of selecting the optimal SOC-OCV characteristics (table) from a plurality of SOC-OCV characteristics (tables) transmitted from the server device 1.

Furthermore, the stored information on the state of health ($FCC/FCC_0$, $FCC_0$ is the initial full charge capacity) of the battery cell may be transmitted from the server device 1 to the vehicle 3. The use of the state of health of the battery cell can increase the accuracy of the table for the vehicle 3.

A balancing circuit 45 is electrically connected to the secondary battery 41 illustrated in FIG. 2 for balancing processing. The balancing circuit 45 has an active type or a passive type. The active balancing circuit has a function of striking the balance by distributing capacity between a plurality of battery cells connected to each other in series. The passive balancing circuit has a function of striking the balance by a method of consuming the capacity of some battery cells in the assembled battery. Note that although FIG. 2 illustrates an example where a passive balancing circuit is used as the balancing circuit 45, an active balancing circuit may be used.

The balancing circuit 45 includes at least a plurality of resistors 46(1) to 46(n) (note that n is a natural number greater than or equal to 2) for the plurality of battery cells 44(1) to 44(n).

Furthermore, the balancing circuit 45 includes at least a plurality of switches SW21(1) to SW21(n) (note that n is a natural number greater than or equal to 2) for the plurality of battery cells 44(1) to 44(n) and the plurality of resistors 46(1) to 46(n).

In the balancing circuit 45, a group including the resistor 46(1) and the switch SW21(1) is surrounded by a dotted line, and this is referred to as a circuit 47(1). The balancing circuit 45 includes a plurality of circuits 47(1) to 47(n) (note that n is a natural number greater than or equal to 2) for the battery cells. The structure of the circuit 47 is different between an active type and a passive type in many cases, but the structure including the resistor and the switch is common thereto in many cases. That is, the circuit 47 can be applied to an active balancing circuit or a passive balancing circuit.

In the plurality of battery cells and the plurality of circuits described above, it is preferable that n be equal, i.e., the same number of battery cells and circuits be provided: however, a circuit can be shared by 2 or more and 15 or less battery cells, for example. When the circuit is shared, the cost can be reduced.

The balancing circuit 45 has a function of equalizing the SOC of the plurality of battery cells 44(1) to 44(n). The function can also be referred to as a function of managing all the battery cells to operate in a safe operation region. Here, the function of equalizing the SOC or the importance of equalizing the SOC is described using four battery cells (the first battery cell 44(1) to a fourth battery cell 44(4)) illustrated in FIG. 3.

Figure 3:
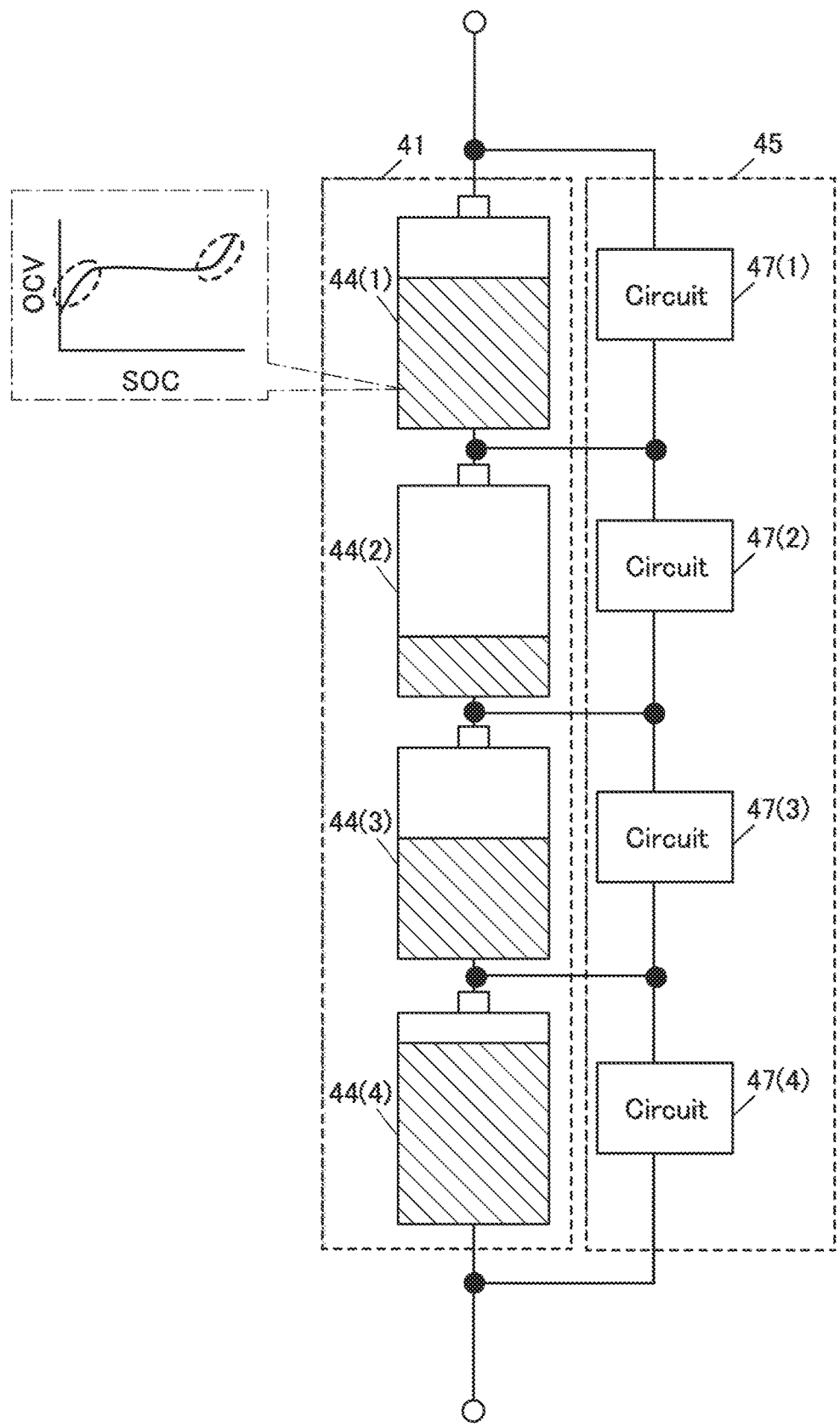
FIG. 3 is a diagram showing balancing processing or a balancing circuit of one embodiment of the present invention.

As shown in FIG. 3, the SOC is different between the first battery cell 44(1) to the fourth battery cell 44(4) at a certain time. This means that the SOC-OCV characteristics shown in FIG. 3 are different between the battery cells. This state is referred to as a state where the SOC is varied among the first battery cell 44(1) to the fourth battery cell 44(4). FIG. 3 shows the case where the level of the SOC is as follows: the fourth battery cell 44(4)>the first battery cell 44(1)>the third battery cell 44(3)>the second battery cell 44(2).

The first circuit 47(1) to the fourth circuit 47(4) are electrically connected to the first battery cell 44(1) to the fourth battery cell 44(4), respectively. As already described above, the first battery cell 44(1) to the fourth battery cell 44(4) are included in the secondary battery 41 illustrated in FIG. 2. Furthermore, the first circuit 47(1) to the fourth circuit 47(4) are included in the balancing circuit 45 illustrated in FIG. 2.

When the charging of the secondary battery 41 is started with the SOC states shown in FIG. 3, the charging of the fourth battery cell 44(4) is completed first. When the charging of the secondary battery 41 is continued with the fourth battery cell 44(4) fully charged, the fourth battery cell 44(4) is in an overcharged state. On the other hand, in the case where the charging of the secondary battery 41 is terminated when the fourth battery cell 44(4) is fully charged, the battery cells other than the fourth battery cell 44(4) are not fully charged, and the capacity available for discharging of the secondary battery 41 is reduced.

When the secondary battery 41 is used with the SOC states shown in FIG. 3, the capacity of the second battery cell 44(2) runs out first. When the secondary battery 41 is continuously used with the capacity of the second battery cell 44(2) running out, the second battery cell 44(2) is in an overdischarged state. On the other hand, in the case where the use of the secondary battery 41 is stopped when the capacity of the second battery cell 44(2) runs out, the capacity remains in the battery cells other than the second battery cell 44(2), and the capacity available for discharging of the secondary battery 41 is reduced.

In order to inhibit such reduction of the capacity available for discharging, the SOC of the battery cells is desirably equalized. Equalizing the SOC of the battery cells is referred to as balancing processing. The determination that the balancing processing is needed for the storage battery pack 4 is sometimes made in charging or the like on the basis of the states as shown in FIG. 3.

In order to equalize the SOC of the battery cells, the current SOC of each battery cell needs to be estimated with high accuracy. Since it is difficult to measure the SOC of each battery cell, the estimation is preferably performed in the server device 1 using measurable values (current and voltage) of each battery cell. When voltage is used as the measurable value, the SOC can be estimated using the SOC-OCV characteristics as shown in FIG. 3. The measured voltage can correspond to the OCV of the SOC-OCV characteristics. The timing of executing the SOC estimation using the OCV is preferably the initial stage of charging and the end of charging that are indicated by dotted circles in FIG. 3. The initial stage of charging and the end of charging are each a period during which the OCV greatly changes but the SOC slightly changes in the SOC-OCV characteristics. The periods are each preferable as the estimation timing because the influence of an OCV error on the SOC estimation is reduced.

The timing of executing the SOC estimation may be the middle stage of charging between the initial stage of charging and the end of charging shown in FIG. 3. In the middle stage of charging, the change of the OCV greatly affects the change of the SOC in the SOC-OCV characteristics. In this period, current accumulation (e.g., coulomb counting) is preferably used in the SOC-OCV characteristics. For the current accumulation, the amount of current flowing through each battery cell needs to be grasped. The SOC can be estimated by a combination of the measured amount of current, the obtained FCC of each battery cell, and a method such as a Kalman filter.

In the case where the SOC is estimated using the current accumulation, the following calculation is preferably performed on a unit of each battery cell.

$$SOC(t) = SOC(t_0) + \frac{1}{FCC}\int_{t_0}^{t} i(\tau)d\tau \qquad \text{[Formula 1]}$$

In the above formula, FCC refers to full charge capacity, and when the state of health (SOH) of each battery cell is transmitted from the server device 1, FCC is preferably calculated in the following manner: the SOH is multiplied by the $FCC_0$ that is the initial FCC stored in the vehicle 3. Note that SOH equals to $FCC/FCC_0$.

Machine learning is preferably performed in the vehicle 3, and through the machine learning, an optimal table can be determined or the internal resistance in each SOC can be estimated.

The internal resistance in each SOC can be estimated from current and voltage that are measured in the battery cell included in the vehicle 3, for example. As described in an estimation method of internal resistance in Embodiment 2, a resistance component with a high response speed and a resistance component with a low response speed of the internal resistance may be separately estimated. It is considered that the resistance component with a high response speed relates to electron transfer resistance, and the resistance component with a low response speed relates to diffusive resistance of ions in an active material solid. The battery cell deteriorates because of repetitive charging and discharging, but the deterioration state is different depending on the kind and provision environment of the battery cell; and thus the resistance component with a high response speed and the resistance component with a low response speed change differently in some cases. Thus, the separate estimation on the resistance component with a high response speed and the resistance component with a low response speed as described above can be one means for indirectly knowing the deterioration state inside the battery. Therefore, in the case where data on the internal resistance is used for SOC-OCV characteristics estimation. SOC estimation. FCC estimation, and the like, information reflecting the internal state of the battery is increased, whereby the accuracy of various estimation is improved, which is preferable. When the internal resistance estimation is performed in the vehicle 3, the estimated data is preferably included in the successive data transmitted to the server device 1. The estimated data on the internal resistance reflects the deterioration state of each battery, and thus is useful particularly for the FCC estimation in the server device 1. Here, the estimated data of the plurality of vehicles 3 can be accumulated in the server device 1.

In one embodiment of the present invention, when the SOC estimation is executed in the initial stage of charging and at the end of charging, the estimation according to the OCV is performed, and when the SOC estimation is executed in the middle stage of charging, the estimation using current accumulation can be performed. The SOC estimation is desirably executed in the early stage for the balancing processing of each battery cell, and thus the SOC estimation is preferably performed in the initial stage of charging or the middle stage of charging. Although the SOC estimation is preferably executed in the server device, the SOC estimation may be executed in the control portion or the like of the vehicle.

The SOC-OCV characteristics are affected by deterioration because of, for example, repetitive charging and discharging and change over time. Therefore, in order to obtain the current, i.e., the latest, SOC-OCV characteristics with high accuracy, estimation according to a large amount of data is necessary and time for an arithmetic operation is taken in some cases.

The deterioration does not occur uniformly, and thus the SOC-OCV characteristics vary among the battery cells. In addition, variation of deterioration rates, variation of impedance, or variation of self-discharge rates occurs, for example. Examples of the variation of deterioration rate include temperature dependence (e.g., the deterioration progresses at higher temperature), voltage dependence (e.g., the deterioration progresses at higher charge voltage), and discharge depth dependence (e.g., the deterioration progresses at larger discharge depth). Since they relate to each other complicatedly, the SOC estimation of each battery cell is difficult; and when the above dependence is taken into consideration, a huge amount of calculation is required for the SOC estimation.

Thus, in one embodiment of the present invention, the arithmetic processing regarding the estimation of the latest SOC-OCV characteristics is preferably executed in the server device 1.

For example, in FIG. 3, in order to equalize the SOC of the other battery cells to the SOC of the second battery cell 44(2) after the vehicle 3 obtains the latest SOC-OCV characteristics, the switches included in the first circuit 47(1), the third circuit 47(3), and the fourth circuit 47(4) for the battery cells other than the second battery cell 44(2) included in the second circuit 47(2) are turned on. Then, discharging is performed in the battery cells other than the second battery cell 44(2), and the SOC of each of the battery cells other than the second battery cell 44(2) can be equalized to the SOC of the second battery cell 44(2). Discharging using the resistor of the circuit 47 is referred to as resistor discharging.

When the SOC is equalized in such a manner, the balancing circuit 45 having a simple circuit structure with a switch and a resistor can be typically used, but it consumes energy wastefully. Furthermore, energy consumption leads to heat generation. In the case where the energy is consumed, the balancing circuit 45 is referred to as a passive balancing circuit or the balancing processing is referred to as passive balancing processing.

The SOC can be equalized by another method. For example, in FIG. 3, in order to equalize the SOC of the other battery cells to the SOC of the fourth battery cell 44(4), the switches included in the first circuit 47(1) to the third circuit 47(3) for the battery cells other than the fourth battery cell 44(4) are turned off, a switch (not illustrated) between a minus terminal of the battery cell 44(3) and a plus terminal of the battery cell 44(4) is turned off, a switch that is included in the fourth circuit 47(4) and connected to the minus terminal of the battery cell 44(3) is turned on, and then charging is started. This enables charging to be performed with the fourth battery cell 44(4) bypassed, and the SOC of the battery cells other than the fourth battery cell 44(4) can be increased to be equalized to the SOC of the fourth battery cell 44(4).

In such a manner, charging needs to be performed with the fourth battery cell 44(4) bypassed. Therefore, compared with the case of equalizing the SOC to that of the second battery cell 44(2), the circuit structure becomes more complicated: for example, the number of switches is increased in each of the secondary battery 41 and the balancing circuit 45. Furthermore, energy consumption leads to heat generation. That is, the balancing circuit 45 corresponds to a passive balancing circuit or the balancing processing corresponds to passive balancing processing.

When the balancing circuit 45 is operated in such a manner, the current SOC value of each battery cell is the reference: thus, the server device 1 preferably estimates the SOC, in which case the highly accurate SOC can be obtained. For the operation of the balancing circuit 45, the SOC estimation in the server device 1 is preferably started in the early timing of charging. Similar to the demand for short-time charging such as a rapid charge mode, balancing processing is desirably completed in a short time. Also in this point, the SOC estimation in the server device 1 is preferably started in the early timing of charging.

For the estimation in the server device 1, AI through an algorithm can be used.

For the estimation in the vehicle 3, AI through an algorithm can be used.

In novel balancing processing of one embodiment of the present invention, the storage battery pack 4 obtains data on the internal state of the battery cell 44 in every certain period, the data is transmitted from the storage battery pack 4 to the server device 1 using the communication network 7 or the like, estimation processing of the internal state is further executed in the server device 1, a plurality of execution results are created and stored, and the storage battery pack 4 selects the data on the internal state that is the closest to the current state of the battery cell 44, that is the data on the latest internal state, from the data stored in the server device 1 or a memory portion 52. Although the storage battery pack 4 and the server device 1 can communicate with each other through a vehicle control unit 50, the storage battery pack 4 may have a communication function.

According to one embodiment of the present invention described above, the data on the SOC and the like can be obtained with high accuracy in a short time. The arithmetic processing of the SOC estimation executed in the server device 1 can be completed in a short time, and the frequency of the arithmetic processing can be increased in the server device 1. Furthermore, the arithmetic processing in the server device 1 can be executed in parallel with the charging of the vehicle 3, and thus the balancing processing can be completed in a short time.

Since the data and the estimation results regarding the SOC and the like stored in the server device 1 have versatility, they can be provided to a plurality of storage battery packs 4. With such a system, the storage battery pack 4 can obtain the SOC and the like estimated with high accuracy, and the storage battery pack 4 does not need another control portion or the like; thus, the SOC can be equalized most efficiently. Wasteful energy consumption in the balancing processing can be inhibited, and the capability of the storage battery pack 4 can be fully used.

In order to achieve the above, the data transmission and reception are performed between the vehicle 3 and the server device 1 as in FIG. 1A and FIG. 1B. The data transmission and reception are preferably performed in the state where the vehicle 3 stops and is connected to the charger 2. When the vehicle 3 is connected to the charger 2, charging of the storage battery pack 4 in the vehicle 3 is started. The charging period during which the power receiving connector 5 is connected to the charger 2 can be divided into the CC (Constant Current) charging period in the initial stage and the middle stage and the CV (Constant Voltage) charging period at the end.

While the power receiving connector 5 is connected to the charger 2, communication between the server device 1 and the vehicle 3 is possible. In the initial and middle stages of charging, i.e., a period corresponding to the CC charging, optimal SOC-OCV characteristics can be determined in the vehicle 3 using the communication.

In the end of charging, i.e., in the CV charging period, the remaining capacity to full charge may be calculated from each battery cell, and a battery cell taking the longest time to full charge may be identified. The timing at which discharging of the circuits 47 is started, i.e., the discharging order of the circuits 47, of the other battery cells may be determined.

Although the table of the SOC-OCV characteristics is created in the server device 1 in the CC charging period, after the charging is completed, the table can be modified by a GPU included in the vehicle if needed.

The vehicle 3 may create a battery gauge table for the passenger (user) by integrating the pieces of the SOC data of the battery cells 44.

The transmission and reception of the first data 11 and the second data 12 become possible by the vehicle control unit 50 illustrated in FIG. 2. The vehicle control unit 50 includes at least a CPU 51, the memory portion 52, and a communication portion 53, and is operated by supply of electric power from the secondary battery 41 or a separately provided storage battery.

The vehicle control unit 50 is referred to as a vehicle control unit in some cases. The vehicle control unit 50 is a control device that determines the vehicle state and maintains an optimal state, and can control the whole vehicle using CAN (Controller Area Network) communication, CAN FD (CAN with Flexible Data rate), in-vehicle Ethernet (registered trademark), or the like.

With the use of the vehicle control unit 50, data on the SOC and the like stored in the server device 1 can be selected. For example, the vehicle control unit 50 includes at least the CPU 51, and the CPU 51 can execute arithmetic processing for selecting the data on the optimal SOC and the like that most closely shows the current state of the battery cell from the data stored in the server device 1 or the memory portion 52. Other than the CPU 51, the vehicle control unit 50 can include a CPU and GPU that can execute arithmetic processing.

The vehicle control unit 50 includes the memory portion 52, and the memory portion 52 includes a RAM, a ROM, and the like. The memory portion 52 can record the SOC-OCV characteristic data of the plurality of battery cells 44. Furthermore, the memory portion 52 can record the data on the SOC and the like that is selected from the server device 1. In addition, the memory portion 52 can record programs for controlling the storage battery pack 4, and the like. When one of the programs is executed, the CPU 51 can select the data on the SOC and the like that most closely shows the current state of each of the plurality of battery cells 44 from the data stored in the server device 1 or the memory portion 52.

The vehicle control unit 50 includes the communication portion 53, and data transmission and reception with the server device 1 can be performed.

The storage battery pack 4 includes a protection circuit 60. A current monitor circuit 61 included in the protection circuit 60 may have a sensor function of measuring charge and discharge current as a measured value obtained from the secondary battery 41. The charge and discharge current is measured using the current monitor circuit 61, whereby coulomb counting can be performed on the battery cell and the data on the SOC and the like can be obtained.

A voltage monitor circuit 62 included in the protection circuit 60 may have a sensor function of measuring the terminal voltage of each battery cell 44 as a measured value obtained from the secondary battery 41 and the like. A temperature monitor circuit 63 included in the protection circuit 60 may have a sensor function of measuring the temperature and the like of each battery cell 44 as a measured value obtained from the secondary battery 41 and the like. A path blocking circuit 64 included in the protection circuit 60 can block the path of the charge and discharge current to the secondary battery 41 and the like.

The vehicle control unit 50 can obtain the measured values from the protection circuit 60 as parameters. In accordance with the obtained measured values, execution of discharging or charging on a battery cell determined to be in an overdischarged state or an overcharged state can be forcibly stopped. Whether or not the execution is forcibly stopped can be determined by the vehicle control unit 50.

The vehicle control unit 50 can control the balancing circuit 45 in accordance with the selected data on the SOC and the like. Specifically, the vehicle control unit 50 can control on or off of the switches SW21(1) to SW21(n) of the balancing circuit 45.

A start switch 71 is electrically connected to the vehicle control unit 50. The vehicle control unit 50 can switch the vehicle 3 between a start-up state and a stop state in accordance with the operation of the start switch 71 by the passenger. Furthermore, the vehicle control unit 50 can switch the vehicle 3 between a start-up state and a stop state in accordance with the charged state of the secondary battery 41, and the start switch 71 can be operated.

In this embodiment, the data on the SOC and the like of each battery cell can be obtained from the storage battery pack 4 as successive data in every certain period, the obtained data can be stored in the server device 1 using the communication network 7 and the like, and the calculation of the SOC estimation can be executed in the server device 1 to calculate the estimation result. In the storage battery pack 4, the data on the SOC and the like that most closely shows the current state of the battery cell 44 is selected from the data stored in the server device 1 or the memory portion 52, and thus the data on the SOC and the like can be obtained with high accuracy in a short time.

Since the data and the estimation results regarding the SOC and the like stored in the server device have versatility, they can be provided to the storage battery packs 4 included in the plurality of vehicles 3.

With such a system, the storage battery pack 4 can obtain the SOC and the like estimated with high accuracy, and the SOC can be equalized most efficiently by the balancing circuit and the like in the processing. The storage battery pack 4 subjected to the balancing processing has a structure in which optimal FCC can be used. In such a structure, the battery can be fully used; thus, the expression "maximal use of a battery" is used in some cases. With the storage battery management system of one embodiment of the present invention, the maximal use of the plurality of battery cells 44 included in the storage battery pack 4 can be achieved.

This embodiment can be implemented in appropriate combination with the other embodiments.

Embodiment 2

Figure 4:
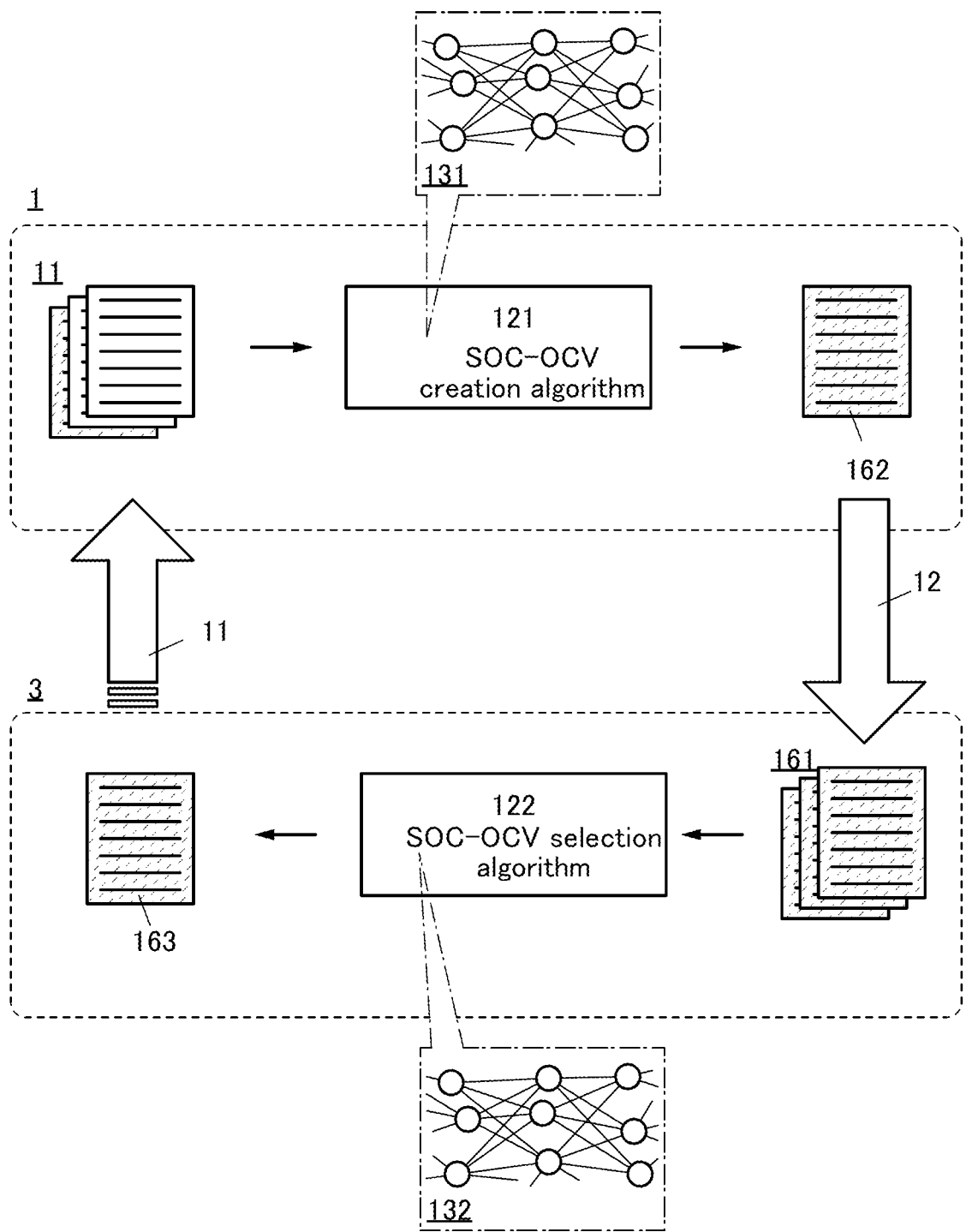
FIG. 4 is a diagram illustrating a processing method regarding SOC-OCV characteristic data of one embodiment of the present invention.

In this embodiment, a processing method regarding SOC-OCV characteristic data and the like are described.
[Processing Method Regarding SOC-OCV Characteristic Data]
FIG. 4 is a diagram regarding the SOC-OCV characteristic data included in the first data 11 and the second data 12, illustrating creation of the SOC-OCV characteristic data in the server device 1 and selection of the SOC-OCV characteristic data in the vehicle 3, e.g., the vehicle control unit 50.

The server device 1 includes a first algorithm 121. The first algorithm 121 has a function of creating first SOC-OCV characteristic data 162 using at least part of the first data 11 as input data. The first SOC-OCV characteristic data 162 includes an estimated value. The first algorithm 121 preferably includes a first neural network 131. The server device 1 has a function of transmitting the first SOC-OCV characteristic data 162 to the vehicle 3 as part of the second data 12. The transmitted first SOC-OCV characteristic data 162 is added as part of an SOC-OCV characteristic data list 161 of the vehicle 3.

The vehicle 3 includes a second algorithm 122. The second algorithm 122 is preferably recorded in the memory portion 52 of the vehicle control unit 50 and the like. The second algorithm 122 has a function of selecting second SOC-OCV characteristic data 163 from a plurality of SOC-OCV characteristic data lists 161 using, as input values, a voltage value, a current value, battery cell temperature, a capacitance value, and the like regarding the storage battery pack 4 that are integrated in the SOC-OCV characteristic data lists 161 and the vehicle control unit 50. The second SOC-OCV characteristic data 163 that most closely shows the state of the battery cell 44 of the vehicle 3 at the time of selection is selected. "Most closely" means the smallest difference from the entire range of the SOC-OCV characteristics of the battery cell. Because actually measuring the entire range of the SOC-OCV characteristics of the battery cell is difficult, the second algorithm 122 needs to select the second SOC-OCV characteristic data 163 on the basis of the limited input data. Therefore, the second algorithm 122 preferably includes a second neural network 132. The second algorithm 122 including the second neural network 132 can select the second SOC-OCV characteristic data 163 that most closely shows the state of the battery cell using the limited input data. Furthermore, the vehicle 3 has a function of transmitting, as part of the first data 11, the second SOC-OCV characteristic data 163 to the server device 1. Note that the second algorithm 122 may be incorporated in an electronic device such as a smartphone owned by a passenger of the vehicle 3.

As the first neural network 131, any one of FFNN (Feedforward Neural Network), CNN (Convolutional Neural Network), RNN (Recurrent Neural Network), and LSTM (Long Short-Term Memory) can be used, for example.

As the second neural network 132, any one of FFNN, CNN, RNN, and LSTM can be used, for example. In the second neural network 132, a decision tree may be used to select the second SOC-OCV characteristic data 163 from the SOC-OCV characteristic data lists 161 as a classification problem.

Figure 5:
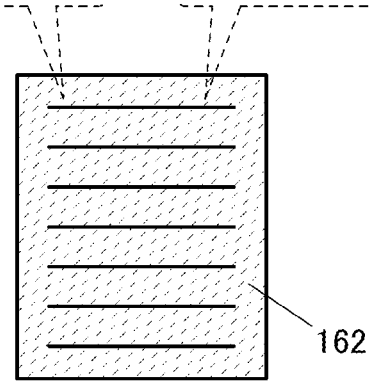
FIG. 5 is a diagram showing a method for writing SOC-OCV characteristic data of one embodiment of the present invention.

Next, a data description method for the first SOC-OCV characteristic data 162 is described with reference to FIG. 5. For the storage battery management system of one embodiment of the present invention, for example, a data description method can be used in which SOC data and OCV data for obtaining the first SOC-OCV characteristic data 162 are assigned to specific bits as shown in FIG. 5. FIG. 5 shows the SOC data description method and a relation between bit data and corresponding SOC [%]. Furthermore, for the OCV data description method, a relation between the bit data and corresponding voltage [V] is shown. When the specific bit data in the SOC data is 0011, for example, the corresponding SOC is 40% and the corresponding voltage in the OCV data is 3.300 V. In a normal usage situation of a battery cell, the battery cell is used so that the SOC is higher than or equal to 0% and lower than or equal to 100%; however, in the case where the battery cell is not used for a long time, the battery cell can be brought into an overdischarged state with an SOC of lower than or equal to 0%. As for charging, overcharging to 100% or higher needs to be dealt with as a potential risk. Therefore, as shown in FIG. 5, it is preferable that the SOC data cover an SOC range lower than 0% and an SOC range higher than 100%. The OCV data and the SOC data are pair data, and the OCV data is assigned so as to correspond to the SOC data.

As an example of the data description method for the first SOC-OCV characteristic data 162, FIG. 5 shows an example in which data is assigned at short intervals in an SOC range near 100%. For a battery cell, the overcharged state exceeding 100% SOC can decrease the safety and battery life of the battery cell; therefore, bit data is preferably assigned more in the SOC range near 100% SOC. The bit data assignment can be performed by the server device 1. The SOC range near 100% SOC is preferably between 90% and 110%, further preferably between 95% and 105%; in this range, bit data is preferably assigned more than or equal to double the bit data assigned in the other range.

The bit data is assigned more in the SOC range near 100% in FIG. 5. In addition, data is preferably assigned at short intervals in an SOC range near 0%. Assigning bit data more also in the SOC range near 0% improves the safety because it easily prevents the vehicle 3 including the battery cell from suddenly shutting down.

Assigning bit data more in part of the SOC range as in FIG. 5 even with a small number of bits can create sufficient SOC-OCV characteristic data, whereby reducing the size of data communication between the server device 1 and the vehicle 3, reducing the size of the data inside the vehicle 3, and the like can be achieved.

Although an example with 4 bits is shown in FIG. 5 for explanation, without limitation thereto, data may be described with more than 4 bits such as 8 bits, 16 bits, 32 bits, and 64 bits, for example. In the case of using a large number of bits, assigning bit data more in part of the SOC range in the above-described manner is sometimes unnecessary. This is because, in the case where the number of bits assigned to the SOC-OCV characteristic data is large, the entire SOC range as well as part of the SOC range can be described in detail.

In the example shown in FIG. 5, as an example of the data description method for the first SOC-OCV characteristic data 162, State A to State D representing the states of the battery cell are assigned to redundant bit data in addition to the assignments of the SOC data and the OCV data. As State A to State D representing the state of the battery cell, data showing danger such as an internal short circuit can be assigned, for example.

As described above, the estimation accuracy of the battery cell can be increased by the storage battery management system of one embodiment of the present invention having the data processing function regarding the SOC-OCV characteristic data. Furthermore, by the server device 1, the SOC-OCV characteristic data can be reduced in size (the data volume can be reduced) and can be made suitable for neural network processing, whereby power consumption of the control portion included in the vehicle 3 can be reduced.

[Processing Function Regarding FCC and Internal Resistance]

Figure 6:
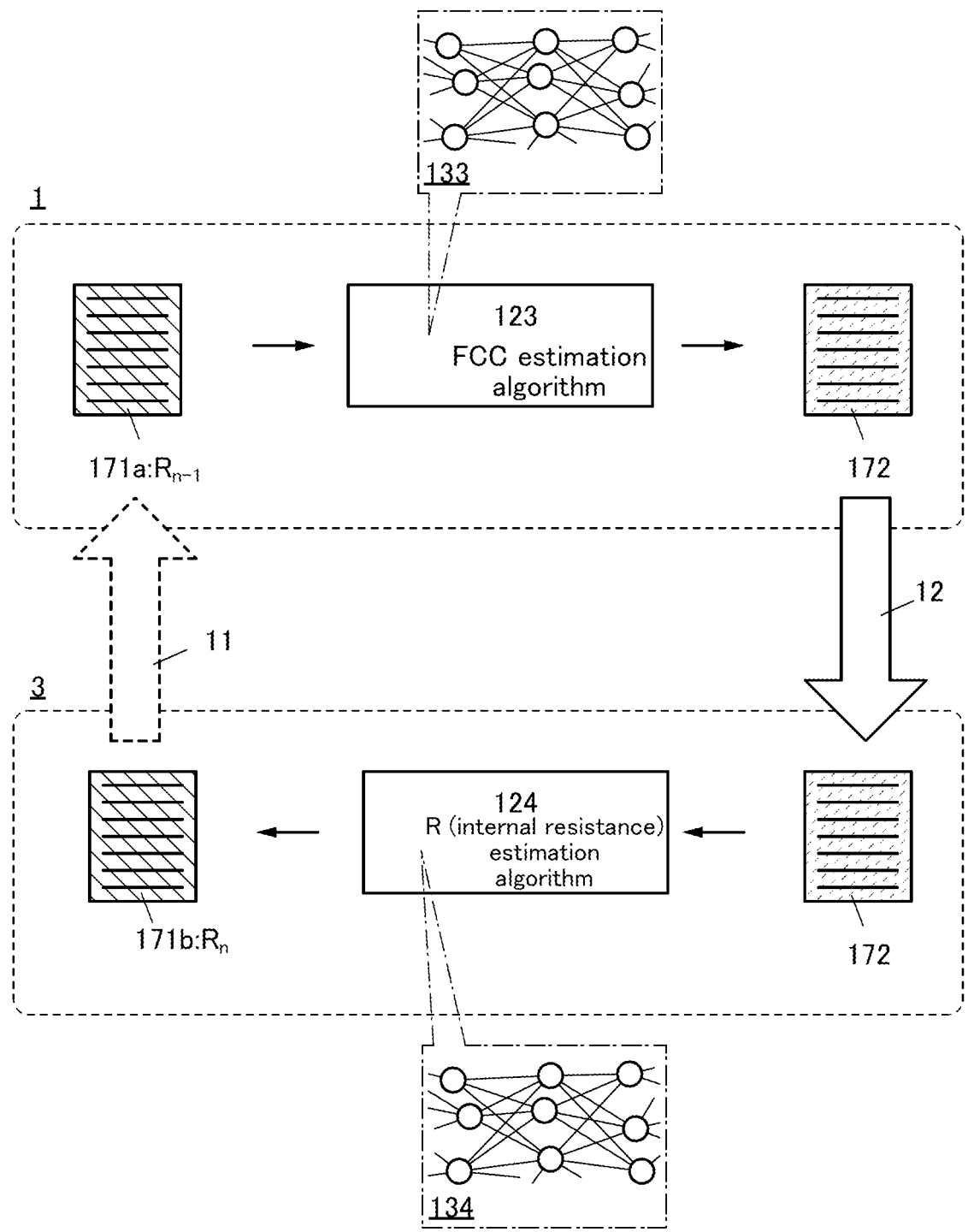
FIG. 6 is a diagram illustrating a processing method regarding FCC and internal resistance of one embodiment of the present invention.

FIG. 6 is an example where, regarding the FCC in the first data 11 and the internal resistance (R) in the second data, the FCC estimation is executed in the server device 1 and the internal resistance estimation is executed in the vehicle 3. As the above, the estimation in the vehicle 3 may be executed in addition to the estimation in the server device 1. Functional structures regarding the estimation of the FCC and the internal resistance in the storage battery management system are described with reference to FIG. 6.

The server device 1 includes a third algorithm 123. The third algorithm 123 has a function of estimating FCC 172 using, as input data, internal resistance 171$a$ (R data of the previous cycle that is estimated in the battery cell and the data is referred to as $R_{n-1}$) that is calculated in accordance with the battery cell. The third algorithm 123 preferably includes a third neural network 133. The server device 1 has a function of transmitting the FCC 172 to the vehicle 3 as part of the second data 12.

The vehicle 3 includes a fourth algorithm 124. The fourth algorithm 124 has a function of estimating internal resistance 171*b* (R data estimated by the battery cell and the data is referred to as $R_n$) of the battery cell using, as input data, the FCC 172, the second SOC-OCV characteristic data 163, and the voltage value, current value, and capacitance value of the battery cell. The fourth algorithm 124 preferably includes a fourth neural network 134. Furthermore, the vehicle 3 has a function of transmitting the internal resistance 171*b* ($R_n$) to the server device 1 as part of the first data 11.

As the third neural network 133, any one of FFNN, CNN, RNN, and LSTM can be used, for example.

As the fourth neural network 134, any one of FFNN, CNN, RNN, and LSTM can be used, for example.

Figure 7:
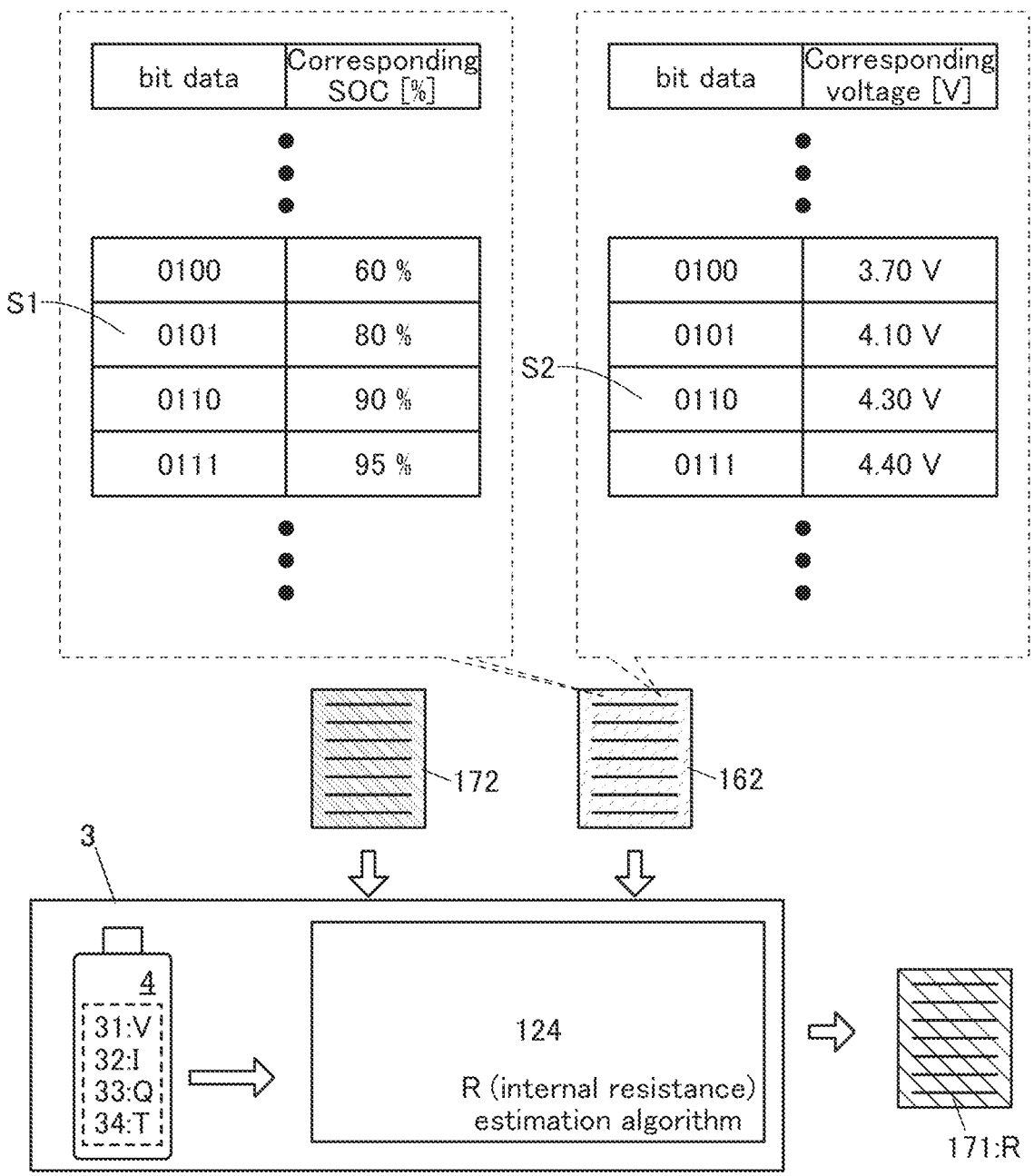
FIG. 7 is a diagram showing a method for estimating internal resistance of one embodiment of the present invention.

Next, a method for estimating the internal resistance 171 (referred to as R) is described with reference to FIG. 7. FIG. 7 shows a function of the fourth algorithm 124 included in the vehicle 3. By the input of the first SOC-OCV characteristic data 162, the FCC 172, and the internal measured values of the battery cell 44 to the fourth algorithm 124, the internal resistance 171 is estimated. The internal resistance may be estimated in the server device 1.

The first SOC-OCV characteristic data 162 is desirably in the data format described with reference to FIG. 5. Note that the internal measured values of each battery cell can be obtained in accordance with a voltage value (V) 31 and a current value (I) 32 measured from the battery cell and a capacitance value (Q) 33 and temperature (T) 34 measured by a coulomb counter or the like.

As described above, the function of the storage battery management system of one embodiment of the present invention regarding the estimation of the FCC and the internal resistance can increase the accuracy of estimating the FCC and the internal resistance of the battery cell. The SOC-OCV characteristic data in a reduced size (in a reduced data volume) is used for the estimation of the internal resistance: this is suitable for the neural network processing. Accordingly, power consumption of the control portion included in the vehicle 3 can be reduced.

[Method for Measuring Internal Resistance]

Figure 8:
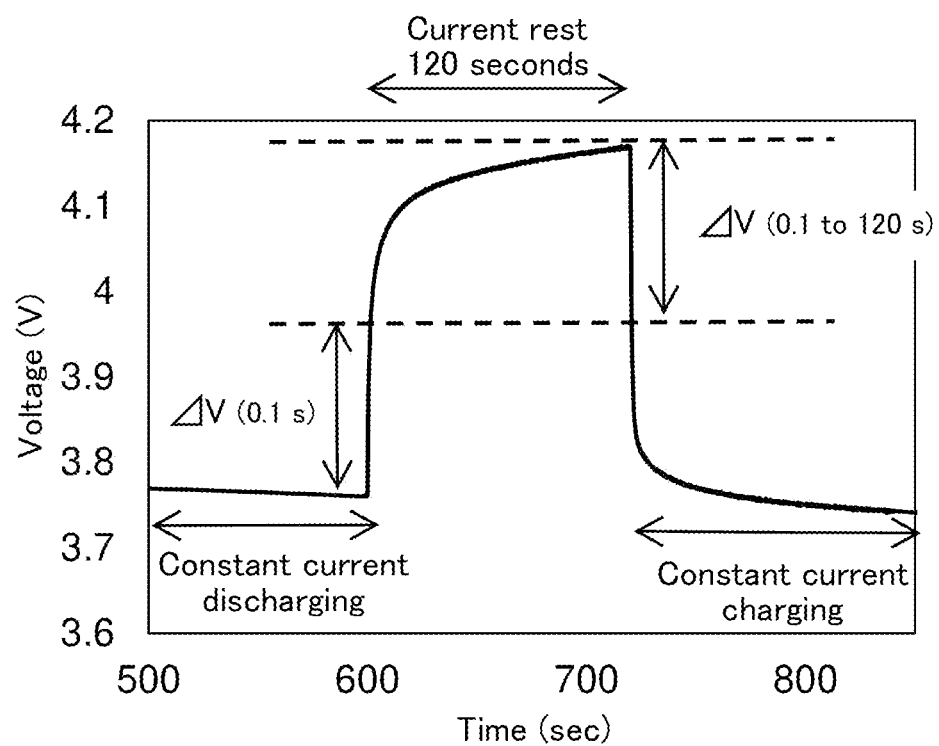
FIG. 8 is a diagram showing an analysis method for measurement by a current-rest-method.

Instead of the method for estimating the internal resistance 171 illustrated in FIG. 7, the internal resistance 171 may be estimated from measurement results of a current-rest-method described in FIG. 8 and FIG. 9. In this case, the fourth algorithm 124 preferably has a function of estimating the internal resistance by a current-rest-method described below.

The current-rest-method is a method in which in CC charging, a rest period during which charging is not performed is provided for a certain time, the voltage change of a battery cell in the rest period is analyzed, and the internal resistance is estimated. Alternatively, the current-rest-method is a method in which in CC discharging, a rest period during which discharging is not performed is provided for a certain time, the voltage change of a battery cell in the rest period is analyzed, and the internal resistance is estimated. The rest period is preferably longer than or equal to 1 second and shorter than or equal to 10 minutes, further preferably longer than or equal to 5 seconds and shorter than or equal to 5 minutes, still further preferably longer than or equal to seconds and shorter than or equal to 3 minutes.

FIG. 8 is a diagram showing an analysis method of a current-rest-method. FIG. 8 shows an example of the current-rest-method in CC discharging, but without limitation thereto, the current-rest-method may be used in CC charging. The difference between the battery voltage just before a rest period and the battery voltage after 0.1 seconds after the rest period starts is ΔV(0.1 s). The difference between the battery voltage after 0.1 seconds after the rest period starts and the battery voltage after 120 seconds after the rest period starts (the battery voltage when the rest period ends) is ΔV(0.1 s to 120 s). Next, ΔV(0.1 s) divided by the current value of the constant current discharge is a resistance component R(0.1 s) with a high response speed, and ΔV(0.1 s to 120 s) divided by the current value of the constant current discharge is a resistance component R(0.1 s to 120 s) with a low response speed. The resistance component R(0.1 s) with a high response speed can be attributed mainly to electrical resistance (electronic conduction resistance), whereas the resistance component R(0.1 s to 120 s) with a low response speed can be attributed mainly to Li diffusion resistance in the active material particles.

Figure 9A:
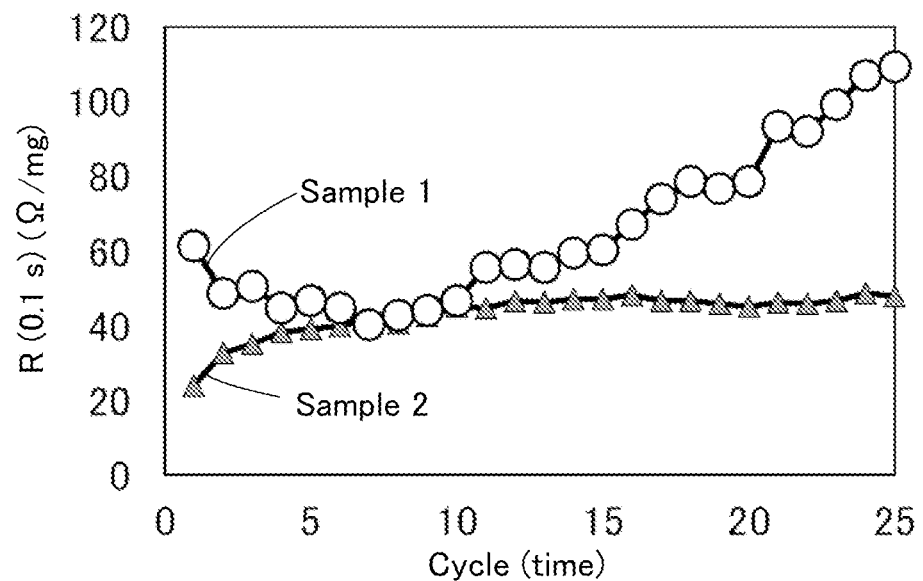
FIG. 9A and FIG. 9B are examples of analysis results of measurement by a current-rest-method.
Figure 9B:
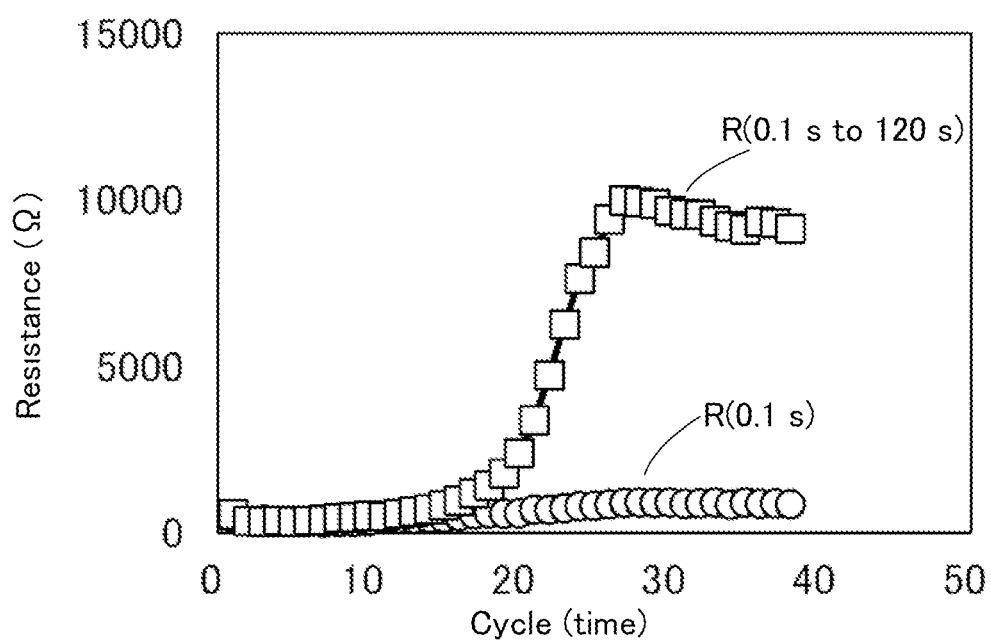

Next, examples of the analysis results by a current-rest-method are described below. As an example where the resistance component R(0.1 s) with a high response speed and the resistance component R(0.1 s to 120 s) with a low response speed of battery samples (Sample 1 and Sample 2) containing different positive electrode active materials are analyzed by the analysis method shown in FIG. 8, a change of the resistance component R(0.1 s) with a high response speed is shown in FIG. 9A. FIG. 9B shows changes of the resistance component R(0.1 s) with a high response speed and the resistance component R(0.1 s to 120 s) with a low response speed of Sample 1.

As shown in FIG. 9A, the resistance component R(0.1 s) with a high response speed of Sample 1 tends to increase after decreasing, and the resistance component R(0.1 s) with a high response speed of Sample 2 only increases. In such a manner, the resistance component R(0.1 s) with a high response speed does not change with a uniform tendency, but changes differently depending on batteries in some cases.

As shown in FIG. 9B, the resistance component R(0.1 s to 120 s) with a low response speed changes more than the resistance component R(0.1 s) with a high response speed. The resistance component R(0.1 s to 120 s) with a low response speed abruptly increases around the 20th cycle and is substantially constant from the 27th cycle. As described above, the resistance component R(0.1 s) with a high response speed and the resistance component R(0.1 s to 120 s) with a low response speed have different tendencies of the change in some cases.

Therefore, the fourth algorithm 124 preferably has a function of predicting a future change in the internal resistance using a neural network such as LSTM for the estimation of time-series data for each of the resistance component R(0.1 s) with a high response speed and the resistance component R(0.1 s to 120 s) with a low response speed.

The server device 1 may have the prediction function described above. The server device 1 preferably has a function of predicting the future change in the internal resistance using a neural network such as LSTM as the estimation of time-series data for each of the resistance component R(0.1 s) with a high response speed and the resistance component R(0.1 s to 120 s) with a low response speed, in which case data corresponding to the secondary batteries 41 included in the plurality of vehicles 3 can be integrated, and the prediction accuracy of the neural network can be improved.

In the case where a plurality of battery cells 44 are included as in the vehicle 3 described in the above examples, the internal resistance is preferably measured, estimated, and predicted in each battery cell. The plurality of battery cells 44 have a characteristic variation because of the nature of manufacturing of the battery cells 44, and environmental temperature might be different depending on positions where the battery cells 44 are provided in the secondary battery 41; therefore, with the measurement, estimation, and prediction of the internal resistance in each of the plurality of battery cells 44, a storage battery control system enabling control with higher accuracy can be obtained.

Note that in order to accurately analyze the resistance component R(0.1 s) with a high response speed and the resistance component R(0.1 s to 120 s) with a low response speed in the estimation of the internal resistance, the synchronism of measured values of the voltage values (V) 31 and the current values (I) 32 that are measured from the battery cells 44 is important. Therefore, in the current monitor circuit 61 and the voltage monitor circuit 62, the voltage values (V) 31 and the current values (I) 32 of the plurality of battery cells 44 are preferably measured not by a scanning A/D conversion portion but by an A/D conversion portion provided for each of the plurality of battery cells 44. In this case, the voltage values (V) 31 of the plurality of battery cells 44 may be obtained using the changes in the current values (I) 32 as a trigger.

The vehicle 3 may include not only the SOC-OCV characteristic data list 161 and the second SOC-OCV characteristic data 163 but also third SOC-OCV characteristic data. The third SOC-OCV characteristic data can be created on the basis of the second SOC-OCV characteristic data 163 and an estimated load on the vehicle 3. As the estimated load, an average current consumption value of the battery cell can be used. In the third SOC-OCV characteristic data, the corresponding voltage in a low SOC range in the OCV data is set higher than that in the second SOC-OCV characteristic data 163 in consideration of the estimated load on the vehicle 3. For simplified example, data of SOC=10% in the second SOC-OCV characteristic data 163 is recorded as data of SOC=0% in the third SOC-OCV characteristic data. In this example, OCV at SOC=0% in the third SOC-OCV characteristic data is higher than OCV at SOC=0% in the second SOC-OCV characteristic data 163. The third SOC-OCV characteristic data can be displayed for the passenger of the vehicle 3, which is preferable because the vehicle 3 can be prevented from suddenly shutting down.

This embodiment can be implemented in appropriate combination with the other embodiments.

Embodiment 3

In this embodiment, a positive electrode used in the battery cell of the present invention is described.

[Positive Electrode]

Figure 10A:
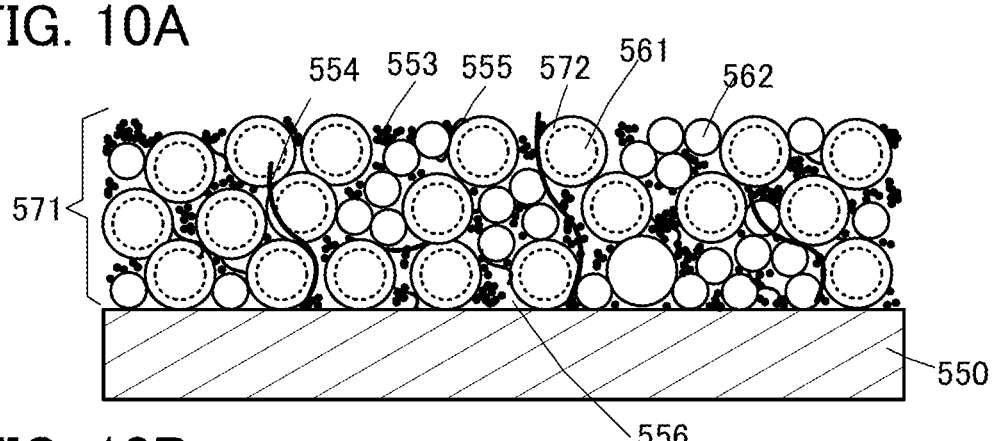
FIG. 10A to FIG. 10C are diagrams illustrating a positive electrode of one embodiment of the present invention.

FIG. 10A illustrates an example of a cross-sectional view of the positive electrode. The positive electrode contains a positive electrode active material layer 571 over a positive electrode current collector 550. The positive electrode active material layer 571 contains a positive electrode active material 561, a positive electrode active material 562, a binder (binding agent) 555, a conductive additive 553, a conductive additive 554, and an electrolyte 556. The positive electrode active material 561 refers to a positive electrode active material having a larger average grain diameter than the positive electrode active material 562.

[Positive Electrode Active Material]

Although sometimes referred to as a positive electrode active material particle, the positive electrode active material 561 and/or the positive electrode active material 562 are/is in any of a variety of forms other than a particle form. The positive electrode active material 561 and/or the positive electrode active material 562 may be a primary particle having a plurality of crystallites, or a secondary particle formed of aggregated primary particles.

As the positive electrode active material 561 and/or the positive electrode active material 562, a material into and from which carrier ions can be inserted and extracted can be used. As the carrier ions, lithium ions, sodium ions, potassium ions, calcium ions, strontium ions, barium ions, beryllium ions, or magnesium ions can be used.

Examples of the material into and from which lithium ions can be inserted and extracted include lithium composite oxides with an olivine crystal structure, a layered rock-salt crystal structure, and a spinel crystal structure. The lithium composite oxide with an olivine crystal structure is represented by $LiMPO_4$ (here, M=any of Fe, Mn, Ni, and Co), for example. Owing to excellent thermal stability, Fe and Mn are expected as next-generation positive electrode materials. The lithium composite oxide with a layered rock-salt crystal structure is represented by $LiMO_2$ (here, M=any of Fe, Mn, Ni, and Co), for example. When M is Co, $LiMO_2$ is denoted as $LiCoO_2$, which is sometimes referred to as LCO and is sometimes called lithium cobalt oxide. In a lithium composite oxide with a layered rock-salt crystal structure, one or more selected from Fe, Mn, Ni, and Co may be contained as M.

Examples of the composite oxide containing Ni, Mn, and Co include a NiCoMn-based material (also referred to as NCM) represented by $LiNi_xCo_yMn_zO_2$ (x>0, y>0, and 0.8<X+y+z<1.2). Specifically, 0.1x<y<8x and 0.1x<z<8x are preferably satisfied, for example. For example, x, y, and z preferably satisfy x:y:z=1:1:1 or the neighborhood thereof. Alternatively, for example, x, y, and z preferably satisfy x:y:z=5:2:3 or the neighborhood thereof. Alternatively, for example, x, y, and z preferably satisfy x:y:z=8:1:1 or the neighborhood thereof. Alternatively, for example, x, y, and z preferably satisfy x:y:z=9:0.5:0.5 or the neighborhood thereof. Alternatively, for example, x, y, and z preferably satisfy x:y:z=6:2:2 or the neighborhood thereof. Alternatively, for example, x, y, and z preferably satisfy x:y:z=1:4:1 or the neighborhood thereof.

The above-described NiCoMn-based material preferably contains one or more selected from aluminum, magnesium, titanium, and boron at higher than or equal to 0.1 mol % and lower than or equal to 3 mol %.

Besides, oxides such as $V_2O_5$ and $Nb_2O_5$ are studied as positive electrode materials. For example, examples of a lithium composite oxide with a spinel crystal structure include a lithium manganese spinel ($LiMn_2O_4$).

The lithium composite oxide may contain at least one or two or more elements selected from nickel, chromium, aluminum, iron, magnesium, molybdenum, zinc, zirconium, indium, gallium, copper, titanium, niobium, silicon, fluorine, phosphorus, and the like. A lithium composite oxide containing Ni, Mn, and Co and further containing aluminum is sometimes referred to as NCMA. A lithium composite oxide containing Ni and Co and further containing aluminum is sometimes referred to as NCA.

The average grain diameter of the positive electrode active material 561 is greater than or equal to 1 μm and less than or equal to 50 µm, preferably greater than or equal to 5 µm and less than or equal to 20 µm. When the positive electrode active material 561 is a ternary composite oxide such as NCM, the positive electrode active material 561 can be regarded as a secondary particle, and the average grain diameter of the secondary particle is preferably greater than or equal to 1 µm and less than or equal to 50 µm, further preferably greater than or equal to 5 µm and less than or equal to 20 µm.

The positive electrode active material 562 having a different particle size is further added in some cases to increase the filling density of the active material. "Having a different particle size" means having a different local maximum value of the average particle diameter. For example, the positive electrode active material 562 is a positive electrode active material having a smaller local maximum value of the average grain diameter than the positive electrode active material 561. The local maximum value of the average grain diameter of the positive electrode active material 562 is preferably greater than or equal to 1/6 and less than or equal to 1/10 of the local maximum value of the average grain diameter of the positive electrode active material 561. When the active materials with different particle sizes are mixed, the filling density of the active materials in the positive electrode active material layer 571 can be increased.

The charging density can be increased without the positive electrode active material 562. When the positive electrode active material 562 is not included, the number of manufacturing steps can be reduced and furthermore, the cost can be reduced.

The positive electrode active material 561 and/or the positive electrode active material 562 have/has a grain boundary in some cases. The grain boundary is positioned between crystallites in some cases.

The positive electrode active material 561 and/or the positive electrode active material 562 sometimes contain/contains an added element in a surface portion. FIG. 10A illustrates a surface portion 572 of the positive electrode active material 561. In a cross-sectional view, the surface portion 572 extends 50 nm or less, preferably 35 nm or less, further preferably 20 nm or less, most preferably 10 nm or less inward from the surface of the positive electrode active material 561.

The added element is preferably unevenly distributed in the surface portion. Uneven distribution refers to a state where the added element exists non-uniformly or unevenly, and in this state, the concentration of the added element is higher in one region than another region. Uneven distribution may be denoted by segregation or precipitation.

Some kinds of added elements do not contribute to capacity as positive electrode active materials. Such an added element is preferably unevenly distributed in the surface portion of the positive electrode active material. The state where the added element is unevenly distributed can be checked from the fact that the added element exists at a higher concentration in the surface portion of the positive electrode active material than inside the positive electrode active material. The added element existing at least in the surface portion can hinder structural degradation at the time of charging and discharging, which inhibits the positive electrode active material from degrading.

A structure in which the surface portion 572 is provided with respect to the inside of an active material is sometimes referred to as a core-shell structure. The core-shell structure can also be applied to the positive electrode active material 562.

[Binder]

The binder 555 is provided to prevent the positive electrode active material 561 or the conductive additive 553 from slipping off from the positive electrode current collector 550. The binder 555 has a function of fixing the positive electrode active material 561 and the conductive additive 553 to each other. Thus, there are the binder 555 positioned to be in contact with the positive electrode current collector 550, the binder 555 positioned between the positive electrode active material 561 and the conductive additive 553, and the binder 555 positioned to be intertwined with the conductive additive 553.

The binder 555 contains a resin that is a high molecular material. When a lot of binder is contained, the proportion of the positive electrode active material 561 in the positive electrode active material layer 571 sometimes decreases. Such a decrease in the proportion of the positive electrode active material 561 leads to lowered discharge capacity of a secondary battery: thus, the mixed quantity of the binder 555 is minimized.

[Conductive Additive]

Since the positive electrode active material 561 is a composite oxide, it sometimes has high resistance. This makes it difficult to collect a current from the positive electrode active material 561 to the positive electrode current collector 550. In that case, the conductive additive 553 and/or the conductive additive 554 have/has a function of giving aid to a current path between the positive electrode active material 561 and the positive electrode current collector 550, a current path between a plurality of the positive electrode active materials 561, a current path between a plurality of positive electrode active materials and the positive electrode current collector 550, and the like. To have such a function, the conductive additive 553 and/or the conductive additive 554 are/is formed of a material having lower resistance than the positive electrode active material 561, and there are the conductive additive 553 and/or the conductive additive 554 that are/is positioned to be in contact with the positive electrode current collector 550 and the conductive additive 553 and/or the conductive additive 554 that are/is positioned in a gap of the positive electrode active material 561.

The conductive additive 553 is also referred to as a conductivity-imparting agent or a conductive material because of its function, and a carbon material or a metal material is used as the conductive additive 553. Examples of the carbon material used as the conductive additive 553 include carbon black (e.g., furnace black, acetylene black, and graphite). Carbon black has a smaller grain diameter than the positive electrode active material 561. Examples of a fibrous carbon material used as the conductive additive 554 include a carbon nanotube (CNT) and VGCF 35 (registered trademark). As a sheet-like carbon material used as the conductive additive 554, multilayer graphene is given. In FIG. 10A, which is a cross section of the positive electrode, a carbon material in sheet form sometimes looks like a thread.

The conductive additive 553 in particle form can enter a gap of the positive electrode active material 561 and easily aggregates. Thus, the particulate conductive additive 553 can give aid to a conductive path between positive electrode active materials provided close to each other (adjacent positive electrode active materials). Although having a bent region, the conductive additive 554 in fiber form or sheet form is larger than the positive electrode active material 561. The conductive additive 554 in fiber form or sheet form can thus give aid to not only a conductive path between adjacent positive electrode active materials but also a conductive path between positive electrode active materials located apart from each other. A particulate conductive additive, a fibrous conductive additive, and a sheet-shaped conductive additive are preferably mixed.

In the case of mixing graphene as a sheet-like conductive additive and carbon black as a particulate conductive additive, the weight of the carbon black is 1.5 times to 20 times, preferably 2 times to 9.5 times the weight of graphene in slurry.

When the mixing ratio between graphene and carbon black is in the above range, carbon black does not aggregate and is easily dispersed. When the mixing ratio between graphene and carbon black is in the above range, the electrode density can be higher than when only carbon black is used as a conductive additive. As the electrode density is higher, the capacity per unit weight can be higher. Specifically, the density of the positive electrode active material layer can be higher than 3.5 g/cc.

A positive electrode in which graphene and carbon black mixed are used as conductive additives can cope with more rapid charging than a positive electrode in which only graphene is used as a conductive additive. Furthermore, it is preferable that the mixing ratio between graphene and carbon black be in the above range.

An example of a secondary battery included in a vehicle is a laminated secondary battery. The number of laminated secondary batteries is increased for higher capacity in an attempt to increase the vehicle's mileage. Accordingly, the laminated batteries increase the weight of the vehicle, which increases the energy necessary to move the vehicle. Without an increase in the number of laminated secondary batteries and a substantial change in the total weight of the vehicle, the mileage can be extended.

Since electric power is needed to charge the secondary battery with higher capacity included in the vehicle, it is desirable to end charging fast. A secondary battery included in a vehicle preferably has high capacity, in which case what is called a regenerative charging, in which electric power temporarily generated when the vehicle is braked is used for charging, can be performed at high speed.

[Electrolyte]

The electrolyte 556 preferably contains a solvent and a metal salt serving as a carrier ion. As the solvent of the electrolyte, an aprotic organic solvent is preferably used: for example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, ethyl acetate, methyl propionate, ethyl propionate, propyl propionate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of them can be used in an appropriate combination at an appropriate ratio.

One or more ionic liquids (room temperature molten salts) that are less likely to burn and volatize can be used as the solvent of the electrolyte to prevent the secondary battery from exploding or catching fire, for example, even when the internal temperature increases owing to an internal short circuit, overcharging, or the like in the secondary battery. An ionic liquid contains a cation and an anion, specifically, an organic cation and an anion. Examples of the organic cation used for the electrolyte include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolyte include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

As the salt dissolved in the above-described solvent, for example, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Ch_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)$ $(CF_3SO_2)$, and $LiN(C_2F_5SO_2)_2$ can be used, or two or more of these lithium salts can be used in an appropriate combination at an appropriate ratio.

The electrolyte used for the secondary battery is preferably highly purified and contains a small number of dust particles and elements other than the constituent elements of the electrolyte (hereinafter, also simply referred to as impurities). Specifically, the weight ratio of impurities to the electrolyte is preferably less than or equal to 1%, further preferably less than or equal to 0.1%, still further preferably less than or equal to 0.01%.

Furthermore, an additive agent such as vinylene carbonate, propane sultone (PS), tert-butylbenzene (TBB), fluoroethylene carbonate (FEC), lithium bis(oxalate) borate (LiBOB), or a dinitrile compound such as succinonitrile or adiponitrile may be added to the electrolyte. The concentration of the material to be added in the whole solvent is, for example, higher than or equal to 0.1 wt % and lower than or equal to 5 wt %. VC or LiBOB is particularly preferable because it facilitates formation of a favorable coating film.

A solution containing a solvent and a salt serving as a carrier ion is referred to as an electrolyte solution in some cases.

A polymer gel electrolyte obtained in such a manner that a polymer is swelled with an electrolyte solution may be used.

When a polymer gel electrolyte is used, safety against liquid leakage and the like is improved. Moreover, a secondary battery can be thinner and more lightweight.

As a polymer that undergoes gelation, a silicone gel, an acrylic gel, an acrylonitrile gel, a polyethylene oxide-based gel, a polypropylene oxide-based gel, a fluorine-based polymer gel, or the like can be used.

Examples of the polymer include a polymer having a polyalkylene oxide structure, such as polyethylene oxide (PEO): PVDF: polyacrylonitrile; and a copolymer containing any of them. For example, PVDF-HFP, which is a copolymer of PVDF and hexafluoropropylene (HFP), can be used. The formed polymer may be porous.

As the electrolyte, a solid electrolyte containing an inorganic material can be used. For example, a sulfide-based solid electrolyte, an oxide-based solid electrolyte, or a halide-based solid electrolyte can be used. Alternatively, a solid electrolyte containing a high-molecular material such as a PEO (polyethylene oxide)-based high-molecular material can be used. In the case where the solid electrolyte is used, a separator and a spacer are not necessary. Furthermore, the battery can be entirely solidified; therefore, there is no possibility of liquid leakage and thus the safety of the battery is dramatically improved.

The sulfide-based solid electrolyte includes a thio-LISICON-based material (e.g., $Li_{10}GeP_2S_{12}$ or $Li_{3.25}Ge_{0.25}P_{0.75}S_4$), sulfide glass (e.g., $70Li_2S \cdot 30P_2S_5$, $30Li_2S \cdot _{26}B_2S_3 \cdot 44LiI$, $63Li_2S \cdot 36SiS_2 \cdot 1Li_3PO_4$, $57Li_2S \cdot 38SiS_2 \cdot 5Li+SiO_4$, or $50Li_2S \cdot 50GeS_2$), or sulfide-based crystallized glass (e.g., $Li_7P_3S_{11}$ or $Li_{3.25}P_{0.95}S_4$). The sulfide-based solid electrolyte has advantages such as high conductivity of some materials, low-temperature synthesis, and ease of maintaining a path for electrical conduction after charging and discharging because of its relative softness.

Examples of the oxide-based solid electrolyte include a material with a perovskite crystal structure (e.g., $La_{2/3-x}Li_{3x}TiO_3$), a material with a NASICON crystal structure (e.g., $Li_{1-x}Al_xTi_{2-x}(PO_4)_3$), a material with a garnet crystal structure (e.g., $Li_7La_3Zr_2O_{12}$), a material with a LISICON crystal structure (e.g., $Li_{14}ZnGe_4O_{16}$), LLZO ($Li_7La_3Zr_2O_{12}$), oxide glass (e.g., $Li_3PO_4$-$Li_4SiO_4$ and $50Li_4SiO_4 \cdot 50Li_3BO_3$), and oxide-based crystallized glass (e.g., $Li_{1.07}Al_{0.69}Ti_{1.46}(PO_4)_3$ and $Li_{1.5}Al_{0.5}Ge_{1.5}(PO_4)_3$). The oxide-based solid electrolyte has an advantage of stability in the air.

Examples of the halide-based solid electrolyte include $LiAlCl_4$, $Li_3InBr_6$, LiF, LiCl, LiBr, and LiI. Moreover, a composite material in which pores of porous aluminum oxide or porous silica are filled with such a halide-based solid electrolyte can be used as the solid electrolyte.

Alternatively, different solid electrolytes may be mixed and used.

In particular, $Li_{1+x}Al_xTi_{2-x}(PO_4)_3$ $(0)<x<1)$ having a NASICON crystal structure (hereinafter, LATP) is preferable because it contains aluminum and titanium, each of which is the element the positive electrode active material used in the secondary battery 400 of one embodiment of the present invention is allowed to contain, and thus synergy of improving the cycle performance is expected. Moreover, higher productivity due to the reduction in the number of steps is expected. Note that in this specification and the like, a material with a NASICON crystal structure refers to a compound that is represented by $M_2(AO_4)_3$ (M: transition metal; A: S, P, As, Mo, W, or the like) and has a structure in which $MO_6$ octahedra and $AO_4$ tetrahedra that share common corners are arranged three-dimensionally.

[Current Collector]

For the positive electrode current collector 550, metal foil containing aluminum, titanium, copper, nickel, or the like can be used. Slurry containing the positive electrode active material layer 571 is applied onto the metal foil and is dried to complete the positive electrode. The metal foil may be covered with a carbon material.

The slurry contains at least the positive electrode active material 561, the binder 555, and a solvent, and it is preferable that the conductive additive 553 and/or the conductive additive 554 be further mixed in this slurry. Slurry may also be referred to as slurry for an electrode or active material slurry: in some cases, slurry for forming a positive electrode active material layer is referred to as slurry for a positive electrode, and slurry for forming a negative electrode active material layer is referred to as slurry for a negative electrode.

Figure 10B:
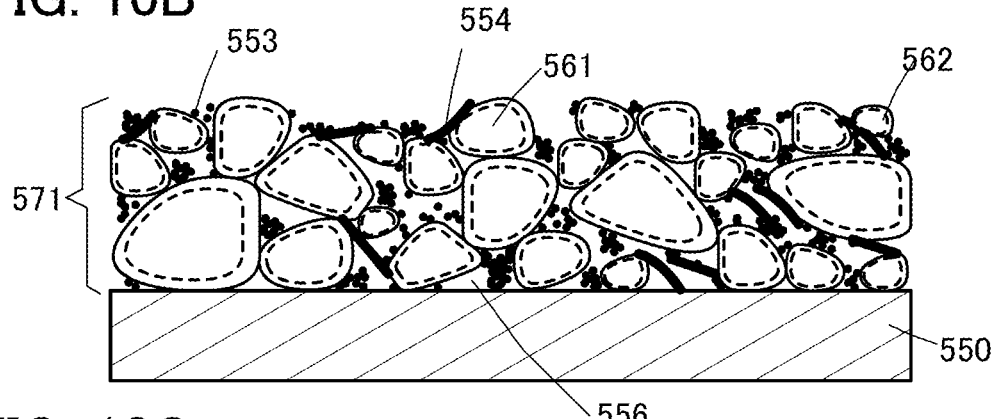

Although FIG. 10A illustrates the positive electrode active material 561 in particle form, the positive electrode active material 561 is not necessarily in particle form. As illustrated in FIG. 10B, the cross-sectional shape of the positive electrode active material 561 may be an ellipse, a rectangle, a trapezoid, a pyramid, a quadrilateral with rounded corners, or an asymmetrical shape. Note that by pressing in the manufacturing process of the positive electrode, the particulate positive electrode active material sometimes changes in shape to have the shape as illustrated in FIG. 10B.

Figure 10C:
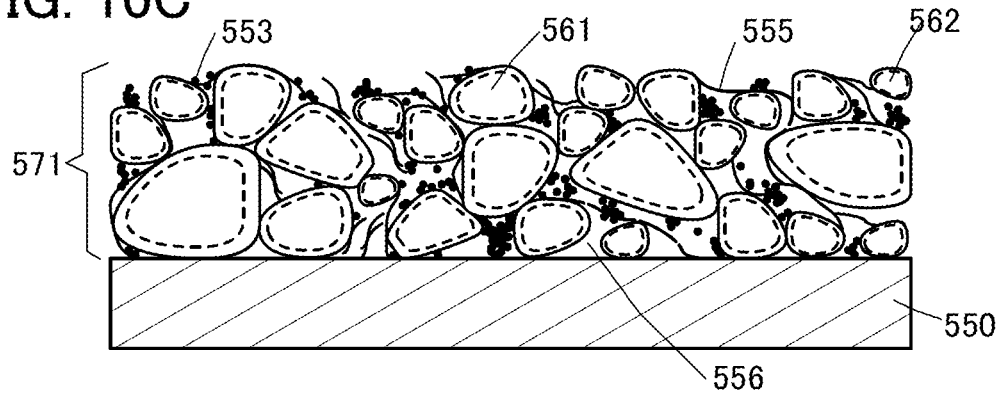

FIG. 10C illustrates an example of a positive electrode in which a carbon nanotube is used instead of the graphene in FIG. 10B. With the use of the carbon nanotube, aggregation of carbon black such as acetylene black can be prevented and the dispersibility can be increased.

In FIG. 10C, the regions filled with neither the positive electrode active material 561 nor a carbon nanotube are voids, some of which are impregnated with the electrolyte 556. The positive electrode active material 561 has a gap to facilitate impregnation with the electrolyte 556, and this gap is a cavity. The volume of the positive electrode active material 561 sometimes changes in charging and discharging; however, a fluorine-containing electrolyte 556 including an organic solvent and an ionic liquid, such as fluorinated carbonate ester, between the plurality of active materials 561 maintains smoothness of the active material and the like and inhibits a crack even when the volume changes in charging and discharging, so that an effect of increasing the cycle performance is obtained. It is important to have an organic compound containing fluorine between a plurality of active materials included in the positive electrode.

The secondary battery can be manufactured using any one of the positive electrodes in FIG. 10A to FIG. 10C. A stack in which a separator is laid over the positive electrode and a negative electrode is laid over the separator is put in a container (e.g., an exterior body or a metal can) or the like, and the container is filled with the electrolyte.

[Negative Electrode]

The negative electrode includes a negative electrode active material layer and a negative electrode current collector. The negative electrode active material layer may include a conductive additive and a binding agent.

<Negative Electrode Active Material>

As the negative electrode active material, for example, an alloy-based material or a carbon-based material can be used. The negative electrode active material used for the secondary battery of one embodiment of the present invention particularly preferably contains fluorine as a halogen. Fluorine has high electronegativity, and the negative electrode active material containing fluorine in its surface portion may have an effect of facilitating extraction of the solvating solvent at the surface of the negative electrode active material.

For the negative electrode active material, an element that enables charge and discharge reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon. In particular, silicon has a high theoretical capacity of 4200 mAh/g. For this reason, silicon is preferably used as the negative electrode active material. Alternatively, a compound containing any of the above elements may be used. For example, SiO (which is silicon monoxide and is expressed as SiOx in some cases; x is preferably greater than or equal to 0.2 and less than or equal to 1.5), $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn are given. Here, an element that enables charge and discharge reactions by an alloying reaction and a dealloying reaction with lithium, a compound containing the element, and the like may be referred to as an alloy-based material.

Silicon nanoparticles can be used as the negative electrode active material containing silicon. The median diameter (D50) of a silicon nanoparticle is greater than or equal to 5 nm and less than 1 μm, preferably greater than or equal to 10 nm and less than or equal to 300 nm, further preferably greater than or equal to 10 nm and less than or equal to 100 nm. The silicon nanoparticles may have crystallinity. The silicon nanoparticles may include a region with crystallinity and an amorphous region.

The negative electrode active material containing silicon may be in the form of a silicon monoxide particle including one or more silicon crystal grains. The silicon monoxide may be amorphous. The silicon monoxide particle may be coated with carbon. This particle can be mixed with graphite to be used as the negative electrode active material.

As the carbon-based material, graphite, graphitizing carbon (soft carbon), non-graphitizing carbon (hard carbon), carbon nanotube, graphene, carbon black, or the like is used. Such a carbon-based material preferably contains fluorine. A carbon-based material containing fluorine can also be referred to as a particulate or fibrous fluorocarbon material. In the case where the carbon-based material is subjected to measurement by X-ray photoelectron spectroscopy, the concentration of fluorine is preferably higher than or equal to 1 atomic % with respect to the total concentration of fluorine, oxygen, lithium, and carbon.

Although the negative electrode active material sometimes changes in volume owing to charging and discharging, providing a fluorine-containing organic compound such as a fluorinated carbonate ester between the negative electrode active materials allows the active material and the like to easily slip even when the volume change occurs at the time of charging and discharging, and inhibits a crack, thereby bringing about an effect of increasing cycle performance. It is important to have an organic compound containing fluorine between a plurality of negative electrode active materials.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferable because it may have a spherical shape. Moreover, MCMB may preferably be used because it can relatively easily have a small surface area. Examples of natural graphite include flake graphite and spherical natural graphite.

Graphite has a low potential substantially equal to that of a lithium metal (greater than or equal to 0.05 V and less than or equal to 0.3 V vs. Li/Li+) when lithium ions are inserted into graphite (while a lithium-graphite intercalation compound is formed). For this reason, a lithium-ion secondary battery can have a high operating voltage. In addition, graphite is preferred because of its advantages such as a relatively high capacity per unit volume, relatively small volume expansion, low cost, and a higher level of safety than that of a lithium metal.

As the negative electrode active material, an oxide such as titanium dioxide ($TiO_2$), lithium titanium oxide ($Li_4Ti_5O_{12}$), a lithium-graphite intercalation compound ($Li_xC_6$), niobium pentoxide ($Nb_2O_5$), tungsten oxide ($WO_2$), or molybdenum oxide ($MoO_2$) can be used.

Alternatively, as the negative electrode active material, $Li_{3-x}M_xN$ (M is Co, Ni, or Cu) with a $Li_3N$ structure, which is a composite nitride of lithium and a transition metal, can be used. For example, $Li_{2.6}Co_{0.4}N_3$ is preferable because of high charge and discharge capacity (900 mAh/g and 1890 mAh/cm$^3$).

A composite nitride of lithium and a transition metal is preferably used, in which case lithium ions are contained in the negative electrode active material and thus the negative electrode active material can be used in combination with a material for a positive electrode active material that does not contain lithium ions, such as $V_2O_5$ or $Cr_3O_8$. Note that even in the case of using a material containing lithium ions as a positive electrode active material, the composite nitride of lithium and a transition metal can be used as the negative electrode active material by extracting the lithium ions contained in the positive electrode active material in advance.

A material that causes a conversion reaction can be used for the negative electrode active material. For example, a transition metal oxide that does not form an alloy with lithium, such as cobalt oxide (CoO), nickel oxide (NiO), or iron oxide (FeO), may be used as the negative electrode active material. A conversion reaction also occurs in oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

Lithium can also be used as the negative electrode active material. In the case of using lithium as the negative electrode active material, lithium foil can be provided over the negative electrode current collector. Lithium may also be provided over the negative electrode current collector by a gas phase method such as an evaporation method or a sputtering method. In a solution containing lithium ions, lithium may be precipitated on the negative electrode current collector by an electrochemical method.

For the conductive additive and the binder that can be included in the negative electrode active material layer, materials similar to those of the conductive additive and the binder that can be included in the positive electrode active material layer can be used.

For the current collector, copper or the like can be used in addition to a material similar to that for the positive electrode current collector. Note that a material that is not alloyed with carrier ions of lithium or the like is preferably used for the negative electrode current collector.

As another form of the negative electrode of the present invention, a negative electrode that does not contain a negative electrode active material can be used. In a secondary battery including the negative electrode that does not contain a negative electrode active material, lithium can be precipitated on a negative electrode current collector at the time of charging, and lithium on the negative electrode current collector can be dissolved at the time of discharging. Thus, lithium is on the negative electrode current collector in the states except for the completely discharged state.

When the negative electrode that does not contain a negative electrode active material is used, a film may be included over a negative electrode current collector for uniforming lithium deposition. For the film for uniforming lithium deposition, for example, a solid electrolyte having lithium ion conductivity can be used. As the solid electrolyte, a sulfide-particle-based solid electrolyte, an oxide-based solid electrolyte, or a polymer-based solid electrolyte can be used, for example. In particular, the polymer-based solid electrolyte can be uniformly formed as a film over a negative electrode current collector relatively easily, and thus is suitable as the film for uniforming lithium deposition.

When the negative electrode that does not contain a negative electrode active material is used, a negative electrode current collector having unevenness can be used. When the negative electrode current collector having unevenness is used, a depression of the negative electrode current collector becomes a cavity in which lithium contained in the negative electrode current collector is easily deposited, so that the lithium can be prevented from having a dendrite-like shape when being deposited.

[Conductive Additive Modified with Fluorine]

As the conductive additive contained in the negative electrode, the conductive additive contained in the positive electrode can be used.

The conductive additive contained in the negative electrode is preferably modified with fluorine. For example, as the conductive additive, a material obtained by modification of the above-described conductive additive with fluorine can be used.

The conductive additive can be modified with fluorine through treatment or heat treatment using a fluorine-containing gas or plasma treatment in a fluorine-containing gas atmosphere, for example. As the fluorine-containing gas, for example, a fluorine gas or fluoromethane ($CF_4$) can be used.

Alternatively, the conductive additive may be modified with fluorine through immersion in a solution containing hydrofluoric acid, tetrafluoroboric acid, hexafluorophosphoric acid, or the like or a solution containing a fluorine-containing ether compound, for example.

Modification of the conductive additive with fluorine is expected to stabilize the structure of the conductive additive and suppress a side reaction in charging and discharging process of a secondary battery. The suppression of the side reaction can improve charge and discharge efficiency. In addition, a decrease in capacity caused by repetitive charging and discharging can be suppressed. Thus, when the negative electrode of one embodiment of the present invention contains a conductive additive that is modified with fluorine, an excellent secondary battery can be obtained.

In some cases, the stabilization of the structure of the conductive additive stabilizes conduction characteristics, leading to high output characteristics.

[Separator]

The separator is positioned between the positive electrode and the negative electrode. The separator insulates the positive electrode and the negative electrode from each other. It is preferable that the separator have stability with respect to an electrolyte and be formed using a material with an excellent liquid-retaining property. The separator can be formed using, for example, a fiber containing cellulose, such as paper, nonwoven fabric, glass fiber, ceramics, or synthetic fiber containing nylon (polyamide), vinylon (polyvinyl alcohol-based fiber), polyester, polyimide, acrylic, polyolefin, or polyurethane.

The separator preferably has a porosity higher than or equal to 30% and lower than or equal to 85%, further preferably higher than or equal to 45% and lower than or equal to 65%. High porosity is preferred because it facilitates impregnation with an electrolyte. The porosity of the separator on the positive electrode side may be different from that on the negative electrode side, and the porosity on the positive electrode side is preferably higher than the porosity on the negative electrode side. Examples of a structure with different porosities are a single material having different porosities and different kinds of materials with different porosities. In the case where different kinds of materials are used, stacking these materials allows the separator to have different porosities.

The thickness of the separator is preferably greater than or equal to 5 μm and less than or equal to 200 μm, further preferably greater than or equal to 5 μm and less than or equal to 100 μm The separator preferably has an average pore size greater than or equal to 40 nm and less than or equal to 3 μm, further preferably greater than or equal to 70 nm and less than or equal to 1 μm. A large average pore size is preferred because it facilitates passage of carrier ions through the separator. The average pore size of the separator on the positive electrode side may be different from that on the negative electrode side, and the average pore size on the positive electrode side is preferably larger than the average pore size on the negative electrode side. Examples of a structure with different average pore sizes are a single material having different average pore sizes and different kinds of materials with different average pore sizes. In the case where different kinds of materials are used, stacking these materials allows the separator to have different average pore sizes.

The separator preferably has a heat resistance temperature higher than or equal to 200° C.

A separator including a polyimide and having a thickness greater than or equal to 10 μm and less than or equal to 50 μm and a porosity higher than or equal to 75% and lower than or equal to 85% is preferably used to increase the output characteristics of the secondary battery.

The separator may be processed into a bag-like shape to enclose or sandwich any one of the positive electrode or the negative electrode.

The total thickness of the separator is preferably greater than or equal to 1 μm and less than or equal to 100 μm, and as long as having a thickness in this range, the separator may have any of a single-layer structure and a multilayer structure. For the multilayer structure, an organic material film of polypropylene, polyethylene, or the like coated with a ceramic-based material, a fluorine-based material, a polyamide-based material, a mixture thereof, or the like can be used. As the ceramic-based material, for example, aluminum oxide particles, silicon oxide particles, or the like can be used. As the fluorine-based material, for example, PVDF, polytetrafluoroethylene, or the like can be used. As the polyamide-based material, for example, nylon, aramid (meta-based aramid or para-based aramid), or the like can be used.

When the surface of the separator is coated with the ceramic-based material, the oxidation resistance is improved: hence, deterioration of the separator in high-voltage charging and discharging can be suppressed and accordingly, the reliability of the secondary battery can be improved. When the surface of the separator is coated with the fluorine-based material, the separator is easily brought into close contact with an electrode, resulting in high output characteristics. When the surface of the separator is coated with the polyamide-based material, in particular, aramid, heat resistance is improved: hence, the safety of the secondary battery can be improved.

For example, both surfaces of a polypropylene film may be coated with a mixed material of aluminum oxide and aramid. Alternatively, a surface of a polypropylene film that is in contact with the positive electrode may be coated with a mixed material of aluminum oxide and aramid, and a surface of the polypropylene film that is in contact with the negative electrode may be coated with the fluorine-based material.

With the use of such a separator with a multilayer structure, which can have the functions of the materials, insulation between the positive electrode and the negative electrode can be ensured and the safety of the secondary battery can be kept even when the total thickness of the separator is small. This is preferable because in that case, the capacity of the secondary battery per volume can be increased.

This embodiment can be used in appropriate combination with the other embodiments.

Embodiment 4

In this embodiment, an example in which an all-solid-state battery is fabricated using the positive electrode active material obtained in the above embodiment will be described.

Figure 11A:
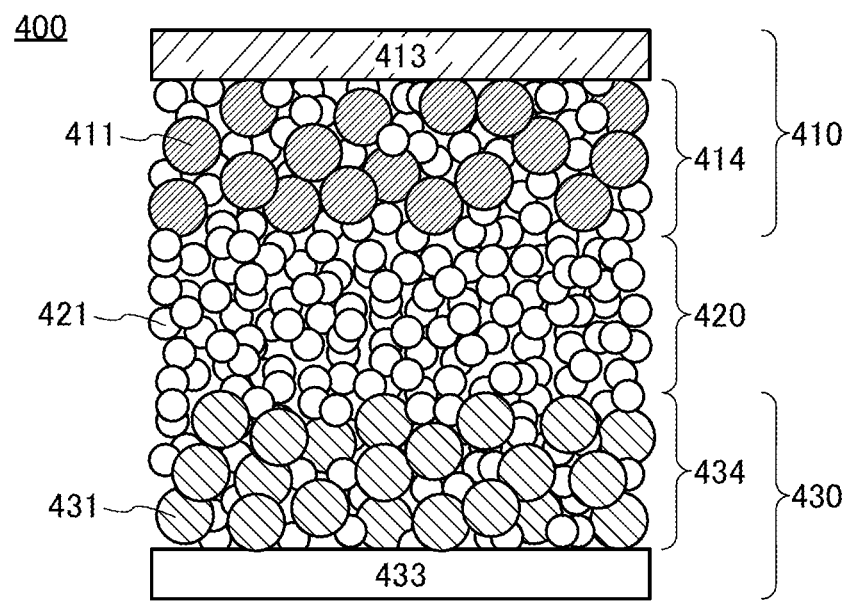
FIG. 11A and FIG. 11B are diagrams illustrating an all-solid-state secondary battery of one embodiment of the present invention.

As illustrated in FIG. 11A, a secondary battery 400 of one embodiment of the present invention includes a positive electrode 410, a solid electrolyte layer 420, and a negative electrode 430.

The positive electrode 410 includes a positive electrode current collector 413 and a positive electrode active material layer 414. The positive electrode active material layer 414 includes a positive electrode active material 411 and a solid electrolyte 421. The positive electrode active material layer 414 may include a conductive additive and a binder.

The solid electrolyte layer 420 includes the solid electrolyte 421. The solid electrolyte layer 420 is positioned between the positive electrode 410 and the negative electrode 430 and is a region that includes neither the positive electrode active material 411 nor a negative electrode active material 431.

Figure 11B:
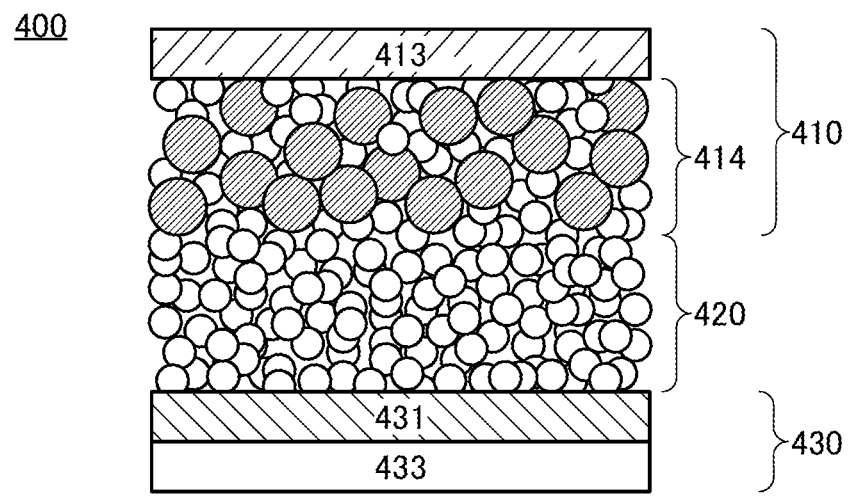

The negative electrode 430 includes a negative electrode current collector 433 and a negative electrode active material layer 434. The negative electrode active material layer 434 includes the negative electrode active material 431 and the solid electrolyte 421. The negative electrode active material layer 434 may include a conductive additive and a binder. Note that when metal lithium is used as the negative electrode active material 431, metal lithium does not need to be processed into particles; thus, the negative electrode 430 that does not include the solid electrolyte 421 can be formed, as illustrated in FIG. 11B. The use of metal lithium for the negative electrode 430 is preferable because the energy density of the secondary battery 400 can be increased.

As the solid electrolyte 421 included in the solid electrolyte layer 420, a sulfide-based solid electrolyte, an oxide-based solid electrolyte, or a halide-based solid electrolyte can be used, for example.

As already described above, the sulfide-based solid electrolyte includes a thio-LISICON-based material (e.g., $Li_{10}GeP_2S_{12}$ or $Li_{3.25}Ge_{0.25}P_{0.75}S_4$), sulfide glass (e.g., $70Li_2S\cdot30P_2S_5$, $30Li_2S\cdot26B_2S_3\cdot44LiI$, $63Li_2S\cdot36SiS_{2.1}Li_3PO_4$, $57Li_2S\cdot38SiS_{2.5}Li_4SiO_4$, or $50Li_2S\cdot50GeS_2$), or sulfide-based crystallized glass (e.g., $Li_7P_3S_{11}$ or $Li_{3.25}P_{0.95}S_4$). The sulfide-based solid electrolyte has advantages such as high conductivity of some materials, low-temperature synthesis, and ease of maintaining a path for electrical conduction after charge and discharge because of its relative softness.

As already described above, the oxide-based solid electrolyte includes a material with a perovskite crystal structure (e.g., $La_{2/3-x}Li_{3x}TiO_3$), a material with a NASICON crystal structure (e.g., $Li_{1-Y}Al_YTi_{2-Y}(PO_4)_3$), a material with a garnet crystal structure (e.g., $Li_7La_3Zr_2O_{12}$), a material with a LISICON crystal structure (e.g., $Li_{14}ZnGe_4O_{16}$), LLZO ($Li_7La_3Zr_2O_{12}$), oxide glass (e.g., $Li_3PO_4\text{-}Li_4SiO_4$ or $50Li_4SiO_4\cdot50Li_3BO_3$), or oxide-based crystallized glass (e.g., $Li_{1.07}Al_{0.69}Ti_{1.46}(PO_4)_3$ or $Li_{1.5}Al_{0.5}Ge_{1.5}(PO_4)_3$). The oxide-based solid electrolyte has an advantage of stability in the air.

As already described above, examples of the halide-based solid electrolyte include $LiAlCl_4$, $Li_3InBr_6$, $LiF$, $LiCl$, $LiBr$, and $LiI$. Moreover, a composite material in which pores of porous aluminum oxide or porous silica are filled with such a halide-based solid electrolyte can be used as the solid electrolyte.

Alternatively, different solid electrolytes may be mixed and used.

As already described above, $Li_{1+x}Al_xTi_{2-x}(PO_4)_3$ (0<x<1) having a NASICON crystal structure (hereinafter, LATP) is preferable because it contains aluminum and titanium, each of which is the element the positive electrode active material used in the secondary battery 400 of one embodiment of the present invention is allowed to contain, and thus synergy of improving the cycle performance is expected. Moreover, higher productivity due to the reduction in the number of steps is expected. Note that in this specification and the like, a NASICON crystal structure refers to a compound that is represented by $M_2(XO_4)_3$(M: transition metal; X: S, P, As, Mo, W, or the like) and has a structure in which $MO_6$ octahedrons and $XO_4$ tetrahedrons that share common corners are arranged three-dimensionally.

This embodiment can be used in appropriate combination with the other embodiments.

Embodiment 5

In this embodiment, a method for forming the positive electrode active material of one embodiment of the present invention by a coprecipitation method is described with reference to flow charts shown in FIG. 12 and FIG. 13 and the like. Note that although the flow chart in FIG. 13 describes part of the process in FIG. 12 in detail, the process described in detail is not always necessary.

Figure 12:
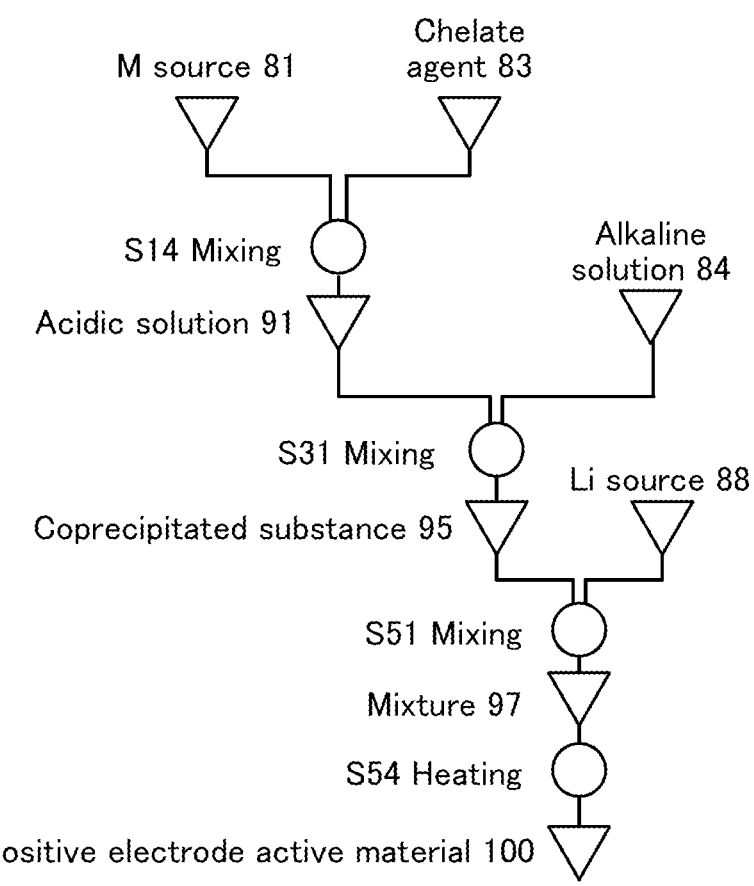
FIG. 12 is a diagram showing a method for forming a positive electrode active material of one embodiment of the present invention.
Figure 13:
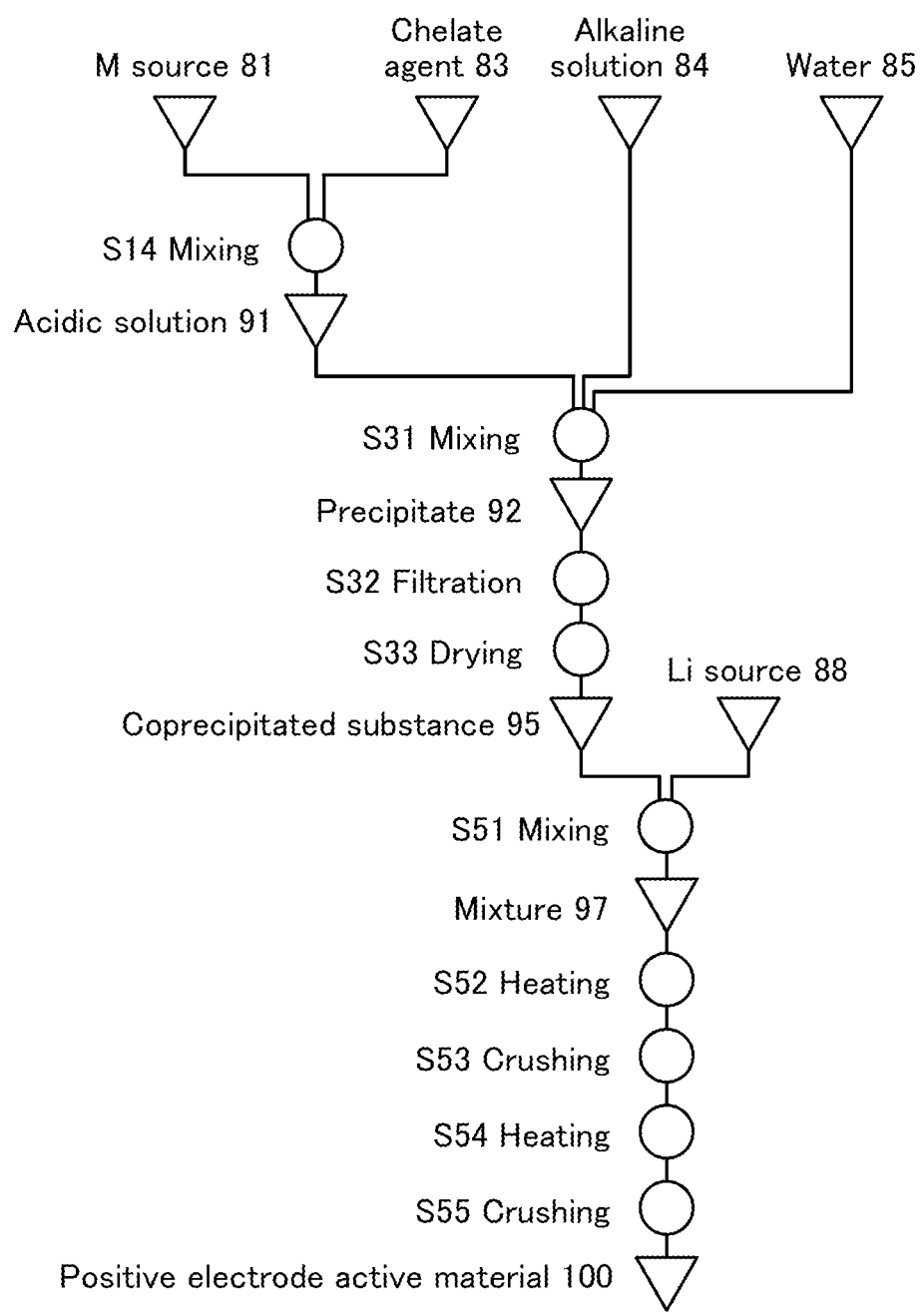
FIG. 13 is a diagram showing a method for forming a positive electrode active material of one embodiment of the present invention.

A transition metal M source 81 (referred to as an M source in diagrams) shown in FIG. 12 and FIG. 13 is described.

<Transition Metal M Source>

As the transition metal M, at least one of nickel, cobalt, and manganese can be used, for example. As the transition metal M, for example, nickel alone: two metals of cobalt and manganese: two metals of nickel and cobalt: or three metals of nickel, cobalt, and manganese may be used.

When at least one of nickel, cobalt, and manganese is used, the mixed ratio of nickel, cobalt, and manganese is preferably set such that a layered rock-salt crystal structure can be formed.

It is particularly preferable that the transition metal M contain a large amount of nickel, in which case the cost of the raw material may be lower than that in the case of containing a large amount of cobalt and charge and discharge capacity per weight may be increased. For example, the proportion of nickel used as the transition metal M preferably exceeds 25 atomic %, is more preferably 60 atomic % or higher, and is still further preferably 80 atomic % or higher. However, when the proportion of nickel is too high, the chemical stability and heat resistance might decrease. Therefore, the proportion of nickel used as the transition metal M is preferably 95 atomic % or lower.

Cobalt is preferably contained as the transition metal M, in which case the average discharge voltage is high and a secondary battery can be highly reliable because cobalt contributes to stabilization of a layered rock-salt structure. Meanwhile, the price of cobalt is higher and more unstable than those of nickel and manganese: thus, a too high proportion of cobalt might increase the cost for manufacturing the secondary battery. For this reason, the proportion of cobalt used as the transition metal M is preferably higher than or equal to 2.5 atomic % and lower than or equal to 34 atomic %.

Note that cobalt is not necessarily contained as the transition metal M.

The transition metal M preferably contains manganese, in which case the heat resistance and chemical stability are improved. However, a too high proportion of manganese tends to decrease discharge voltage and discharge capacity. For this reason, the proportion of manganese used as the transition metal M is preferably higher than or equal to 2.5 atomic % and lower than or equal to 34 atomic %.

Note that manganese is not necessarily contained as the transition metal M.

As the transition metal M source 81, an aqueous solution containing the transition metal M is prepared. As a nickel source, an aqueous solution of nickel salt, e.g., nickel sulfate, nickel chloride, nickel nitrate, or hydrate of any of these can be used. Alternatively, an aqueous solution of an organic acid salt of nickel, such as nickel acetate, or hydrate of the organic acid salt of nickel can be used. Alternatively, an aqueous solution of nickel alkoxide or an organonickel complex can be used. In this specification and the like, the term "organic acid salt" denotes a compound of a metal and an organic acid such as an acetic acid, a citric acid, an oxalic acid, a formic acid, or a butyric acid.

Similarly, as a cobalt source, an aqueous solution of cobalt salt, e.g., cobalt sulfate, cobalt chloride, cobalt nitrate, or a hydrate thereof can be used. Alternatively, an aqueous solution of an organic acid salt of cobalt, such as cobalt acetate, or hydrate of the organic acid salt of cobalt can be used. Alternatively, an aqueous solution of cobalt alkoxide or an organic cobalt complex can be used.

Similarly, as a manganese source, an aqueous solution of manganese salt, such as manganese sulfate, manganese chloride, or manganese nitrate, or hydrate of any of these can be used. Alternatively, an aqueous solution of an organic acid salt of manganese, such as manganese acetate, or hydrate of the organic acid salt of manganese can be used. Alternatively, an aqueous solution of manganese alkoxide or an organomanganese complex can be used.

In this embodiment, an aqueous solution in which nickel sulfate, cobalt sulfate, and manganese sulfate are dissolved in pure water is prepared as the transition metal M source 81. In this case, the atomic ratio of nickel, cobalt, and manganese is expressed by Ni:Co:Mn=8:1:1 or in the neighborhood thereof. The aqueous solution is acidic.

A first additive element may be added to the transition metal M source 81. The specific first additive element preferably contains one or more selected from gallium, aluminum, boron, and indium, for example.

When the first additive element is gallium, a first additive element source can be referred to as a gallium source. As the gallium source, a compound containing gallium is used. As the compound containing gallium, for example, gallium sulfate, gallium chloride, gallium nitrate, or a hydrate thereof can be used. Alternatively, gallium alkoxide or an organogallium complex may be used as the compound containing gallium. Further alternatively, organic acid of gallium such as gallium acetate, or a hydrate thereof may be used as the compound containing gallium.

When the first additive element is aluminum, the first additive element source can be referred to as an aluminum source. As the aluminum source, a compound containing aluminum is used. Aluminum sulfate, aluminum chloride, aluminum nitrate, or a hydrate thereof can be used as the compound containing aluminum, for example. Alternatively, aluminum alkoxide or an organoaluminum complex may be used as the compound containing aluminum. Further alternatively, organic acid of aluminum such as aluminum acetate, or a hydrate thereof may be used as the compound containing aluminum.

When the first additive element is boron, the first additive element source can be referred to as a boron source. As the boron source, a compound containing boron is used. As the compound containing boron, for example, boric acid or a borate can be used.

When the first additive element is indium, the first additive element source can be referred to as an indium source. As the indium source, a compound containing indium is used. As the compound containing indium, for example, indium sulfate, indium chloride, indium nitrate, or a hydrate thereof can be used. Alternatively, indium alkoxide or an organoindium complex may be used as the compound containing indium. Further alternatively, organic acid of indium such as indium acetate, or a hydrate thereof may be used as the compound containing indium.

When a solution is used as the first additive element source, an aqueous solution containing the above compound is prepared.

Here, a chelate agent 83 shown in FIG. 12 and FIG. 13 is described.

<Chelate Agent>

Examples of compounds forming the chelate agent include glycine, oxine, 1-nitroso-2-naphthol, 2-mercaptobenzothiazole, and EDTA (ethylenediaminetetraacetic acid). Note that two or more kinds selected from glycine, oxine, 1-nitroso-2-naphthol, and 2-mercaptobenzothiazole may be used. At least one of the above is dissolved in water (e.g., pure water) and the solution is used as a chelate aqueous solution. The chelate agent is preferred to a general complexing agent in terms of being a complexing agent to form a chelate compound. Needless to say, a general complexing agent may be used, and ammonia water can be used instead of the chelate agent, for example.

The chelate aqueous solution described above is preferably used, in which case generation of unnecessary crystal nuclei is suppressed to promote crystal growth. Since generation of unnecessary crystal nuclei is suppressed to inhibit generation of fine particles, a cobalt compound with good particle size distribution can be obtained. Furthermore, the use of the chelate aqueous solution can slow an acid-base reaction, so that the reaction gradually proceeds to form a nearly spherical cobalt compound.

Glycine described as an example of the compound contained in the chelate aqueous solution has a function of keeping the pH value greater than or equal to 9 and less than or equal to 10 or the vicinity of the range. Therefore, the use of a glycine aqueous solution as the chelate aqueous solution is preferable because it is easy to control the pH in a reaction vessel for obtaining the above cobalt compound.

<Pure Water>

Water used as the above chelate aqueous solution is preferably pure water. The pure water is water with a resistivity of 1 MΩ·cm or higher, preferably water with a resistivity of 10 MΩ·cm or higher, further preferably water with a resistivity of 15 MΩ·cm or higher. Water with the above-described resistivity has high purity and an extremely small amount of impurities.

<Step S14>

Next, Step S14 shown in FIG. 12 and FIG. 13 is described. In Step S14, the transition metal M source 81 and the chelate agent 83 are mixed. Then, an acidic solution 91 is obtained.

Next, an alkaline solution 84 shown in FIG. 12 and FIG. 13 is described.

<Alkaline Solution>

For example, an aqueous solution containing sodium hydroxide, potassium hydroxide, lithium hydroxide, or ammonia is used as the alkaline solution, and the alkaline solution is not limited to the aqueous solution as long as it functions as a pH adjuster. An aqueous solution in which two or more kinds selected from sodium hydroxide, potassium hydroxide, and lithium hydroxide are dissolved in water may be used, for example. The above pure water is preferably used as the water.

Here, water 85 shown in FIG. 13 is described. The water 85 is described as a filling liquid or an adjustment liquid in some cases, and refers to an aqueous solution in the initial state of the reaction. The above pure water or an aqueous solution in which the above chelate agent is dissolved in the above pure water is preferably used as water. When the chelate agent is used, as described above, generation of unnecessary crystal nuclei can be suppressed and crystal growth can be promoted, and when generation of unnecessary crystal nuclei is suppressed, generation of fine particles is suppressed; therefore, the effect is exhibited that a cobalt compound with good particle size distribution can be obtained, or an acid-base reaction can be slowed and thus the reaction gradually proceeds to form a nearly spherical cobalt compound. However, as in FIG. 12, the water 85 is not necessarily used.

<Step S31>

Next, Step S31 shown in FIG. 12 and FIG. 13 is described. In Step S31, the acidic solution 91 and the alkaline solution 84 are mixed. By the mixing, the acidic solution 91 reacts with the alkaline solution 84 to form a coprecipitated substance 95.

The above reaction in Step 31 is referred to as a neutralization reaction, an acid-base reaction, or a coprecipitation reaction in some cases. The obtained coprecipitated substance 95 is referred to as a precursor of the positive electrode active material in some cases.

<Reaction Conditions>

In the case where the acidic solution 91 and the alkaline solution 84 are made to react by the coprecipitation reaction, the pH of a reaction vessel is set to greater than or equal to 9 and less than or equal to 11, preferably greater than or equal to 9.8 and less than or equal to 10.5. The above range is preferable because a particle diameter of a secondary particle of the obtained coprecipitated substance can be large. When the pH is outside the above range, the productivity becomes low, and the obtained coprecipitated substance is likely to contain an impurity.

In the case where the acidic solution 91 is put into the reaction vessel and the alkaline solution 84 is dropped into the reaction vessel, the pH of the aqueous solution in the reaction vessel is preferably kept in the above range. Also in the case where the alkaline solution 84 is put into the reaction vessel and the acidic solution 91 is dropped thereinto, the pH is preferably kept in the above range.

In order that the coprecipitation reaction proceeds more efficiently, it is preferable that the water 85 shown in FIG. 13 be put into the reaction vessel, and the acidic solution 91 be dropped thereinto. When the pH in the reaction vessel is changed from a predetermined value by dropping the acidic solution 91, the pH in the reaction vessel is preferably controlled by dropping the alkaline solution 84.

A solution in the reaction vessel is preferably stirred with a stirring means. The stirring means includes a stirrer, an agitator blade, or the like. Two to six agitator blades can be provided.

The solution temperature in the reaction vessel is adjusted to be higher than or equal to 50° C. and lower than or equal to 90° C. It is preferable to start dropping after a predetermined temperature is achieved. The above range is preferable because a particle diameter of a secondary particle of the obtained coprecipitated substance 95 can be large.

In the reaction vessel, a reflux condenser is preferably placed. The nitrogen gas can be released from the reaction vessel and water can be returned to the reaction vessel with use of the reflux condenser.

Through the above reaction, the coprecipitated substance 95 is precipitated in the reaction vessel as a reaction product.

<Steps S32 and S33>

Here, a precipitate 92, filtration in Step S32, and drying in Step S33 shown in FIG. 13 are described. The precipitate 92 contains the above-described coprecipitated substance 95. The precipitate 92 contains an impurity in addition to the coprecipitated substance 95. Therefore, in order to collect the coprecipitated substance 95, the filtration in Step S32 is preferably performed. Suction filtration or low-pressure filtration can be employed for the filtration. Other than filtration, centrifugation may be employed. In the case of using suction filtration, after a reaction product precipitated in the reaction vessel is washed with pure water, an organic solvent (e.g., acetone) having a low boiling point is preferably added before the suction filtration is performed.

It is preferable that the drying in Step S33 be further performed after the filtration. For example, drying is performed under vacuum at higher than or equal to 60° C. and lower than or equal to 90° C. for longer than or equal to 0.5 hours and shorter than or equal to 3 hours. In this manner, the coprecipitated substance 95 can be obtained.

The coprecipitated substance 95 includes a precursor of the positive electrode active material. The precursor of the positive electrode active material is obtained in the state of a secondary particle which is aggregations of primary particles. Note that in this specification and the like, a primary particle refers to a particle (lump) of the smallest unit having no grain boundary when being observed, for example, at a magnification of 5000 times with a SEM (scanning electron microscope). In other words, the primary particle means a particle of the smallest unit surrounded by a grain boundary. The secondary particle refers to a particle in which the primary particles are aggregated, partially sharing the grain boundary (the circumference of the primary particle or the like) and are not easily separated from each other (an independent particle). That is, the secondary particle has a grain boundary in some cases.

Next, a lithium compound is prepared as a lithium source 88 (denoted as Li source in the drawings) shown in FIG. 12 and FIG. 13.

<Lithium Compound>

Lithium hydroxide, lithium carbonate, lithium oxide, or lithium nitrate are prepared as the lithium compound. For example, when cobalt hydroxide is obtained as the coprecipitated substance 95, lithium hydroxide can be used as the lithium compound.

The lithium compound is preferably ground. A container used for grinding, e.g., a mortar is preferably made of a material that hardly releases an impurity; specifically, a mortar made of alumina with the purity of higher than or equal to 90%, preferably higher than or equal to 99% is used. Alternatively, a wet grinding method using a ball mill or the like may be employed. In a wet grinding method, acetone can be used for a solvent.

<Step S51>

Next, Step S51 shown in FIG. 12 and FIG. 13 is described. In Step S51, the coprecipitated substance 95 and the lithium source 88 are mixed. After that, a mixed mixture 97 is obtained. A planetary centrifugal mixer is preferably used as a unit that mixes the coprecipitated substance 95 and the lithium source 88. Media are not used in the planetary centrifugal mixer, and thus grinding is not performed in many cases.

When the coprecipitated substance 95 and the lithium source 88 are ground at the same time as the mixing, a ball mill or a bead mill is preferably used. Alumina balls or zirconia balls can be used as media of the ball mill or the bead mill. The centrifugal force is applied to the media in the ball mill or the bead mill, and thus microparticulation becomes possible. Note that in the case where contamination from the media and the like might occur, it is preferable that the zirconia balls be used.

Dry grinding and wet grinding can be used when grinding is concurrently performed. Regarding dry grinding, grinding is performed in an inert gas or in air, and a particle can be ground to a particle diameter less than or equal to 3.5 µm, preferably less than or equal to 3 µm. Regarding wet grinding, grinding is performed in a liquid, and a particle can be ground to a nano-size particle diameter. That is, wet grinding is preferably used to obtain a small particle diameter.

In the above manner, the mixture 97 is obtained.

Here, a supplementary explanation of a heating step is provided with reference to Step S52 and Step S53 shown in FIG. 13.

<Step S52>

Next, Step S52 shown in FIG. 13 is described. The heating step may be performed a plurality of times, and as in Step S52, heating may be performed at a temperature higher than or equal to 400° C. and lower than or equal to 700° C. before Step S54 described later. The heating in Step S52 is performed at a lower temperature than that in Step S54 and thus referred to as temporary baking in some cases. By Step S52, gas components contained in the coprecipitated substance 95 or the lithium source 88 are released in some cases. With the use of the material in which the gas components are released, a composite oxide with few impurities can be obtained. However, as in FIG. 12, the positive electrode active material can be obtained without the temporary baking in Step S52.

<Step S53>

Next, Step S53 shown in FIG. 13 is described. In Step S53, a crushing step is performed. For example, it is preferable to perform classification using a sieve with an aperture diameter of greater than or equal to 40 µm and less than or equal to 60 µm. However, as in FIG. 12, the positive electrode active material can be obtained without the crushing step in Step S53.

<Step S54>

Next, Step S54 shown in FIG. 12 and FIG. 13 is described. In Step S54, the mixture is heated. By heating, NCM that is a composite oxide can be obtained. This is the positive electrode active material 100. Step S54 is referred to as main baking in some cases. In consideration of Step S52 and the like, there are a lot of heating steps, and they are sometimes referred to as first baking, second baking, and the like appropriately using ordinal numbers in order to be distinguished from each other.

<Heating Conditions>

The heating temperature is preferably higher than or equal to 700° C. and lower than 1100° C., further preferably higher than or equal to 800° C. and lower than or equal to 1000° C., still further preferably higher than or equal to 800° C. and lower than or equal to 950° C. When a cobalt oxide is formed through this heat treatment, heating is performed at a temperature at which at least the coprecipitated substance 95 and the lithium source 88 are diffused mutually. Because of the temperature, Step S54 is referred to as main baking.

The heating time can be longer than or equal to 1 hour and shorter than or equal to 100 hours, for example, and is preferably longer than or equal to 2 hours and shorter than or equal to 20 hours.

The heating atmosphere is preferably an atmosphere containing oxygen or an oxygen-containing atmosphere that is what is called dry air with little water (e.g., a dew point is lower than or equal to −50° C., and a dew point is preferably lower than or equal to −80° C.).

For example, in the case where the heating is performed at 750° C. for 10 hours, the temperature rising rate is preferably greater than or equal to 150° C./h and less than or equal to 250° C./h. The flow rate of dry air that can form a dry atmosphere is preferably greater than or equal to 3 L/min and less than or equal to 10 L/min. The temperature decreasing time from a specified temperature to room temperature is preferably longer than or equal to 10 hours and shorter than or equal to 50 hours. The temperature decreasing rate can be calculated from the temperature decreasing time or the like.

A crucible, a sagger, a setter, or a container used in the heating is preferably made of a material that hardly releases impurities. For example, a crucible made of alumina with a purity of 99.9% is preferably used. In the case of mass production, a sagger made of mullite cordierite ($Al_2O_3$, $SiO_2$, and MgO) is preferably used, for example.

It is preferable to collect the heated materials after the materials are transferred from the crucible to a mortar in order to prevent impurities from entering the materials. The mortar is preferably made of a material that hardly releases impurities; specifically, a mortar made of alumina or zirconia with the purity of higher than or equal to 90%, preferably higher than or equal to 99% is preferably used.

According to the above, the positive electrode active material 100 such as NCM can be formed. The positive electrode active material 100 can reflect the shape of the coprecipitated substance 95 that is the precursor.

The positive electrode active material 100 such as NCM is preferred in containing few impurities. However, sulfur might be detected, when a sulfide is used as a starting material. With use of GD-MS, ICP-MS, or the like, elements in the whole particle of the positive electrode active material can be analyzed to measure the concentration of sulfur.

Embodiment 6

In this embodiment, a fabrication process of a coated electrode for a positive electrode or a negative electrode is described.

The coated electrode refers to an electrode obtained by forming a positive electrode mixed agent (containing at least a positive electrode active material) on a positive electrode current collector or an electrode obtained by forming a negative electrode mixed agent (containing at least a negative electrode active material) on a negative electrode current collector. Each mixed agent includes a conductive material or a binder in some cases.

For example, the positive electrode active material described in the above embodiment, a conductive material, and a binder are mixed, and a dispersion medium is added to the mixture. After the addition of the dispersion medium, further mixing is performed to form a slurry. The viscosity of the slurry is preferably higher than or equal to 80 pa·s and lower than or equal to 130 pa·s.

The slurry is applied on a positive electrode current collector, and then drying is performed. At least the dispersion medium is volatilized. After that, the slurry may be rolled with pressure. Pressing may be performed a plurality of times each at different pressure, and second pressing is preferably performed at higher pressure than that for first pressing. The coated electrode is completed in this manner. The thickness of the coated electrode is preferably greater than or equal to 1 μm and less than or equal to 10 μm. The electrode density of the coated electrode is preferably greater than or equal to 3.0 g/cm$^3$ and less than or equal to 5.0 g/cm$^3$.

Although the case of the positive electrode is described, the negative electrode can be fabricated in a similar manner.

This embodiment can be used in combination with the other embodiments.

Embodiment 7

In this embodiment, a fabrication process of a secondary battery is described.

Figure 14:
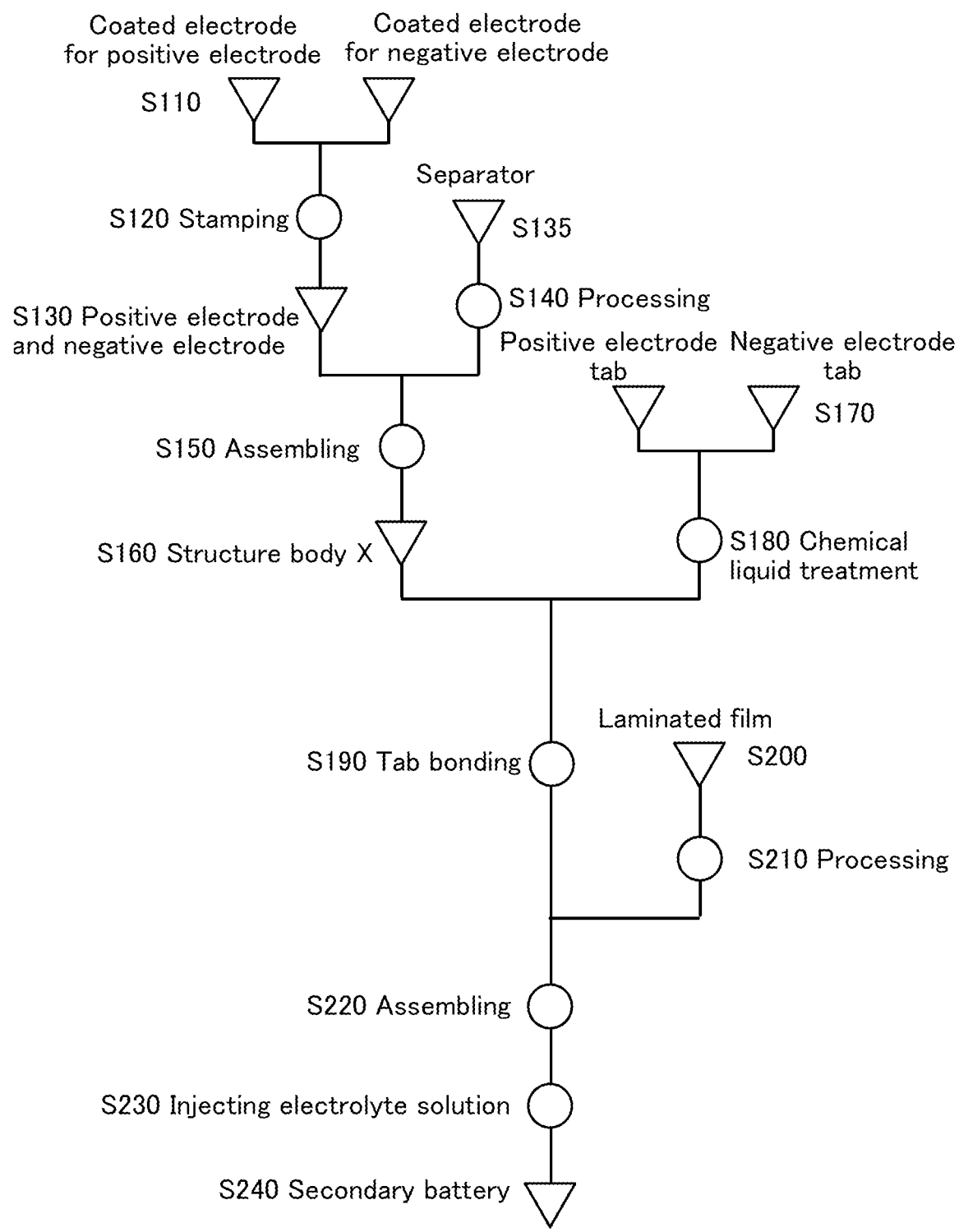
FIG. 14 is a diagram showing a method for fabricating a secondary battery of one embodiment of the present invention.

FIG. 14 shows an example of a fabrication process of a secondary battery. In Step S110, a coated electrode for a positive electrode and a coated electrode for a negative electrode are prepared. Each coated electrode can be fabricated in accordance with the above embodiment, for example.

In Step S120 in FIG. 14, a step of stamping out the coated electrode into a desired shape is performed. A tab region is provided at a position protruding from a rectangular positive electrode or negative electrode, and the one side length of the tab region is greater than or equal to ⅓ and less than or equal to ⅕ of the one side length of the positive electrode or the negative electrode. In the stamping step, a region where the tab is bonded (a tab region) is brought into a conductive state. For example, an insulating film or the like in the tab region stamped out at a predetermined position is removed by a chemical liquid. As the chemical liquid, acetone, ethanol, or N-methyl-2-pyrrolidone (NMP) can be used. In this manner, the positive electrode and the negative electrode that are included in a secondary battery can be obtained in Step S130.

Next, a separator is prepared as shown in Step S135 in FIG. 14, and the separator is processed in Step S140. For example, it is preferable that a cut-out separator be folded in half and processed into a bag-like separator with welded two sides. The width of the welded region is preferably greater than or equal to 3 nm and less than or equal to 10 mm. Heat of higher than or equal to 120° C. and lower than or equal to 170° C., preferably higher than or equal to 130° C. and lower than or equal to 150° C. is applied for welding in some cases: at this time, placing a metal foil in a region not to be welded (a region that forms a bag-like shape) can prevent welding in an undesired region.

Then, as shown in Step S150 in FIG. 14, the positive electrode, the negative electrode, and the separator are assembled. For example, one of the positive electrode and the negative electrode is put into the bag-like separator, and the separator and the other of the positive electrode and the negative electrode are made to overlap with each other. Furthermore, 10 positive electrodes and 10 negative electrodes, each of which is single-side coated, are prepared, and 5 separators are prepared. In the case where the positive electrode is put into the separator, two positive electrodes are put with the positive electrode current collectors facing each other. The other positive electrodes are put into the other separators in the same manner. Two negative electrodes are placed between the separators with the negative electrode current collectors facing each other. A set of two separators are positioned on the outermost surfaces, and one negative electrode is placed on each outermost surface with the negative electrode active material facing the separator. In this manner, a structure body X can be assembled as shown in Step S160. In the structure body X, the tab regions are preferably bonded to each other. For example, the tab regions of the positive electrodes and the tab regions of the negative electrodes are bonded with an ultrasonic metal bonding apparatus.

Next, as shown in Step S170 in FIG. 14, a positive electrode tab and a negative electrode tab are prepared. As shown in Step S180, chemical liquid treatment is performed to remove an insulating film or the like from the positive electrode tab and the negative electrode tab. As the chemical liquid, acetone, ethanol, or NMP can be used.

As shown in Step S190 in FIG. 14, the positive electrode tab and the negative electrode tab are bonded to the structure body X. The positive electrode tab and the negative electrode tab are bonded to the corresponding tab regions that are bonded in Step S160 with an ultrasonic metal bonding apparatus.

Then, a laminated film is prepared as shown in Step S200 in FIG. 14 and the laminated film is processed as shown in Step S210. In the processing, for example, a depressed portion with a depth of greater than or equal to 1 mm and less than or equal to 10 mm, preferably greater than or equal to 1.5 mm and less than or equal to 3 mm is formed in part of the laminated film.

Assembling is performed as shown in Step S220 in FIG. 14. For example, the structure body X to which the tabs are bonded is stored in the depressed portion, the laminated film is folded, and at least two opposing sides are welded. Heat of higher than or equal to 150° C. and lower than or equal to 190° C., preferably higher than or equal to 170° C. and lower than or equal to 180° C. is applied. Furthermore, welding is preferably performed in a dry atmosphere.

Next, as shown in Step S230 in FIG. 14, an electrolyte solution is injected. The electrolyte solution is preferably injected in an inert atmosphere (an atmosphere containing an inert gas). The remaining side of the laminated film is welded. The remaining side is welded in a reduced pressure atmosphere.

Consequently, as shown in Step S240 in FIG. 14, the laminated secondary battery is completed.

<Laminated Secondary Battery>

Figure 15A:
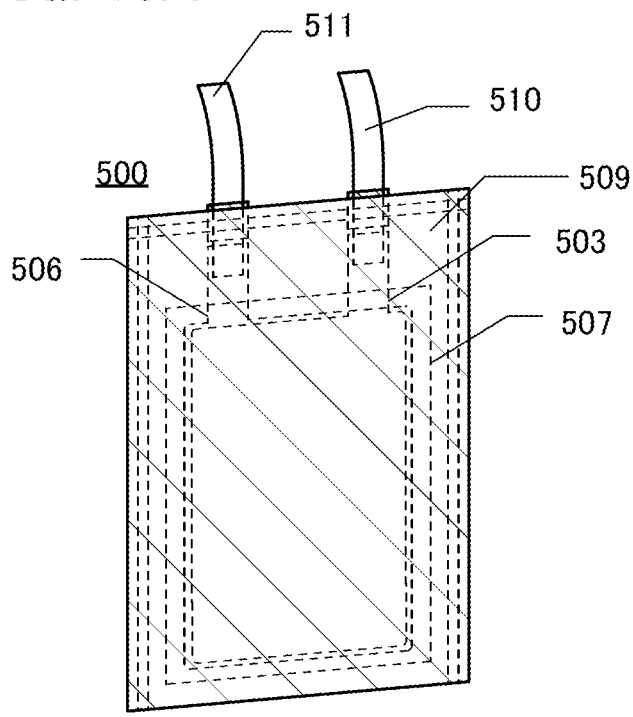
FIG. 15A and FIG. 15B are diagrams illustrating the appearance and the like of a secondary battery of one embodiment of the present invention.
Figure 15B:
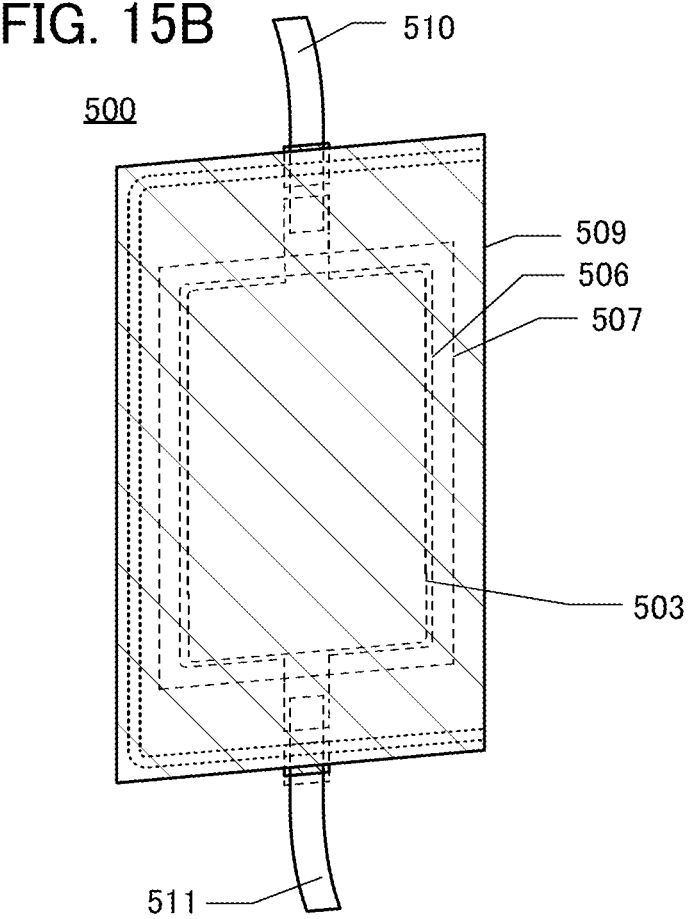

Next, examples of the appearance of a laminated secondary battery are illustrated in FIG. 15A and FIG. 15B. In FIG. 15A and FIG. 15B, a positive electrode 503, a negative electrode 506, a separator 507, an exterior body 509, a positive electrode lead electrode 510, a negative electrode lead electrode 511, and the like are included. The positive electrode lead electrode 510 and the negative electrode lead electrode 511 may be provided on the same side as in FIG. 15A or may be provided on two opposing sides as in FIG. 15B.

This embodiment can be used in appropriate combination with the other embodiments.

Embodiment 8

In this embodiment, other structure examples of a secondary battery are described with reference to FIG. 16 and FIG. 17.

[Other Structure Examples of Secondary Battery]

Figure 16A:
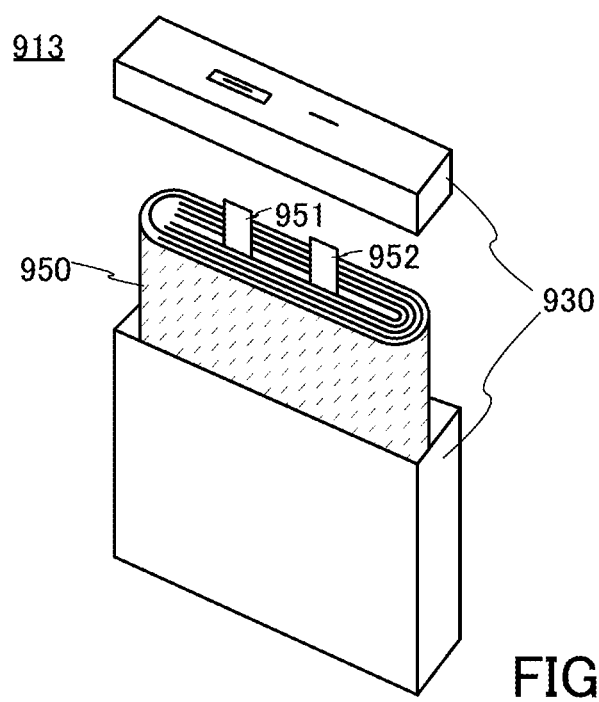
FIG. 16A to FIG. 16C are diagrams illustrating the appearance and the like of a secondary battery of one embodiment of the present invention.

The secondary battery 913 illustrated in FIG. 16A includes a wound body 950 provided with the terminal 951 and the terminal 952 inside a housing 930. The wound body 950 is immersed in an electrolyte solution inside the housing 930. The terminal 952 is in contact with the housing 930. The use of an insulator or the like prevents contact between the terminal 951 and the housing 930. Note that in FIG. 16A, the housing 930 divided into pieces is illustrated for convenience; however, in the actual structure, the wound body 950 is covered with the housing 930 and the terminal 951 and the terminal 952 extend to the outside of the housing 930. For the housing 930, a metal material (e.g., aluminum) or a resin material can be used.

Figure 16B:
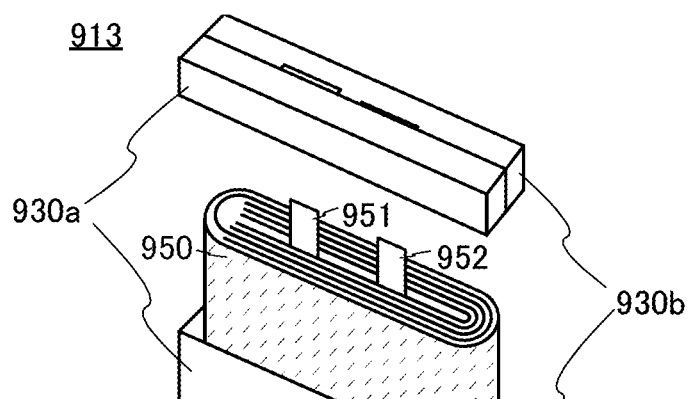

Note that as illustrated in FIG. 16B, the housing 930 illustrated in FIG. 16A may be formed using a plurality of materials. For example, in the secondary battery 913 illustrated in FIG. 16B, a housing 930a and a housing 930b are bonded to each other, and the wound body 950 is provided in a region surrounded by the housing 930a and the housing 930b.

For the housing 930a, an insulating material such as an organic resin can be used. In particular, when a material such as an organic resin is used for the side on which an antenna is formed, blocking of an electric field from the secondary battery 913 can be inhibited. When an electric field is not significantly blocked by the housing 930a, an antenna may be provided inside the housing 930a. For the housing 930b, a metal material can be used, for example.

Figure 16C:
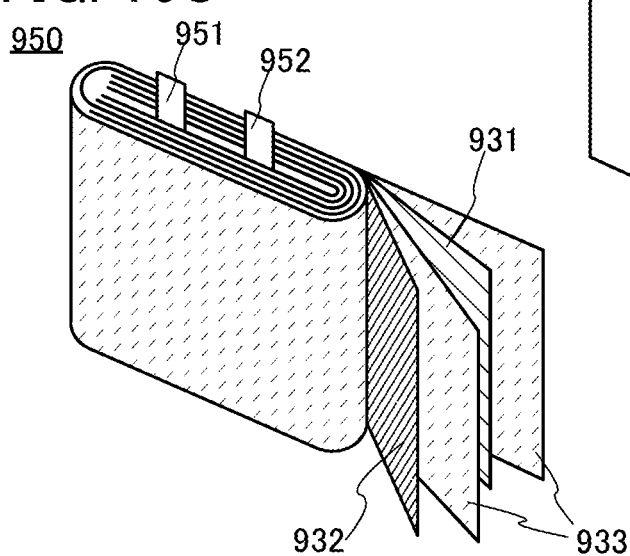

FIG. 16C illustrates the structure of the wound body 950. The wound body 950 includes a negative electrode 931, a positive electrode 932, and separators 933. The wound body 950 is obtained by winding a sheet of a stack in which the negative electrode 931 overlaps with the positive electrode 932 with the separator 933 provided therebetween. Note that a plurality of stacks each including the negative electrode 931, the positive electrode 932, and the separator 933 may be further stacked.

Figure 17A:
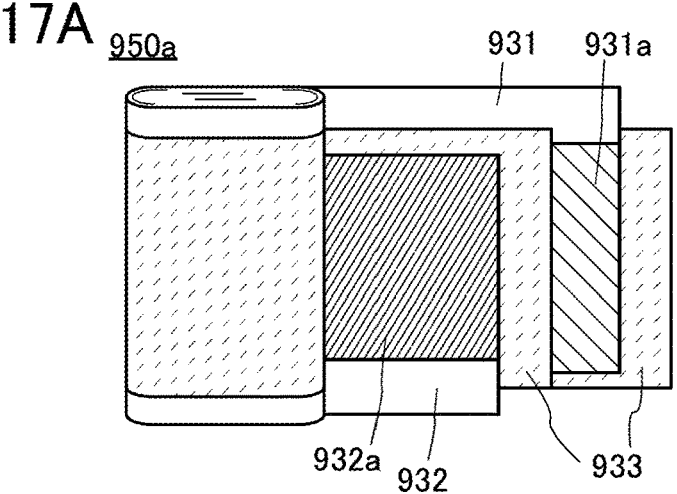
FIG. 17A to FIG. 17C are diagrams illustrating the appearance and the like of a secondary battery of one embodiment of the present invention.
Figure 17B:
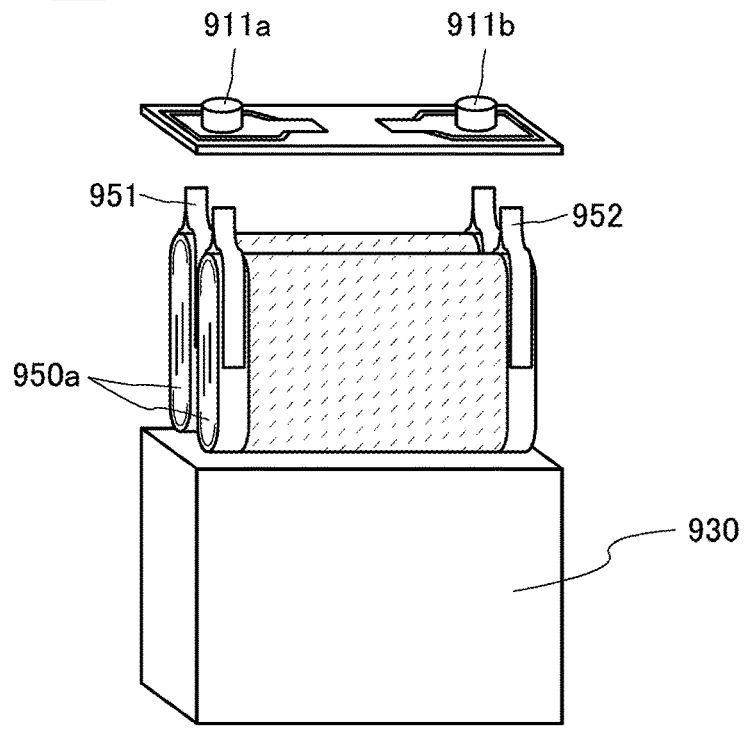
Figure 17C:
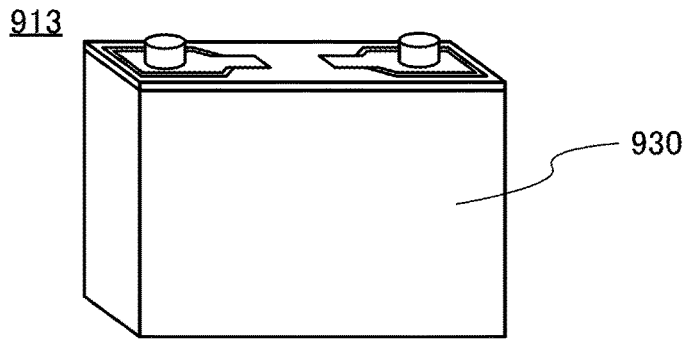

As illustrated in FIG. 17A to FIG. 17C, the secondary battery 913 may include a wound body 950a. The wound body 950a illustrated in FIG. 17A includes a negative electrode 931, a positive electrode 932, and separators 933. The negative electrode 931 includes a negative electrode active material layer 931a. The positive electrode 932 includes a positive electrode active material layer 932a.

The positive electrode active material obtained in the above embodiment is used for the positive electrode 932, whereby the secondary battery 913 can have high capacity, high charge and discharge capacity, and excellent cycle performance.

The separator 933 has a larger width than the negative electrode active material layer 931a and the positive electrode active material layer 932a, and is wound to overlap the negative electrode active material layer 931a and the positive electrode active material layer 932a. In terms of safety, the width of the negative electrode active material layer 931a is preferably larger than that of the positive electrode active material layer 932a. The wound body 950a having such a shape is preferable because of its high degree of safety and high productivity.

As illustrated in FIG. 17B, the negative electrode 931 is electrically connected to the terminal 951. The terminal 951 is electrically connected to a terminal 911a. The positive electrode 932 is electrically connected to the terminal 952. The terminal 952 is electrically connected to a terminal 911b.

As illustrated in FIG. 17C, the wound body 950a and an electrolyte solution are covered with the housing 930, whereby the secondary battery 913 is obtained. The housing 930 is preferably provided with a safety valve, an overcurrent protection element, and the like. In order to prevent the battery from exploding, a safety valve is a valve to be released when the internal pressure of the housing 930 reaches a predetermined pressure.

As illustrated in FIG. 17B, the secondary battery 913 may include a plurality of wound bodies 950a. The use of the plurality of wound bodies 950a enables the secondary battery 913 to have higher charge and discharge capacity. The description of the secondary battery 913 in FIG. 16A to FIG. 16C can be referred to for the other components of the secondary battery 913 in FIG. 17A and FIG. 17B.

<Cylindrical Secondary Battery>

Figure 18A:
FIG. 18A to FIG. 18D are diagrams illustrating the appearance and the like of a secondary battery of one embodiment of the present invention.
Figure 18B:
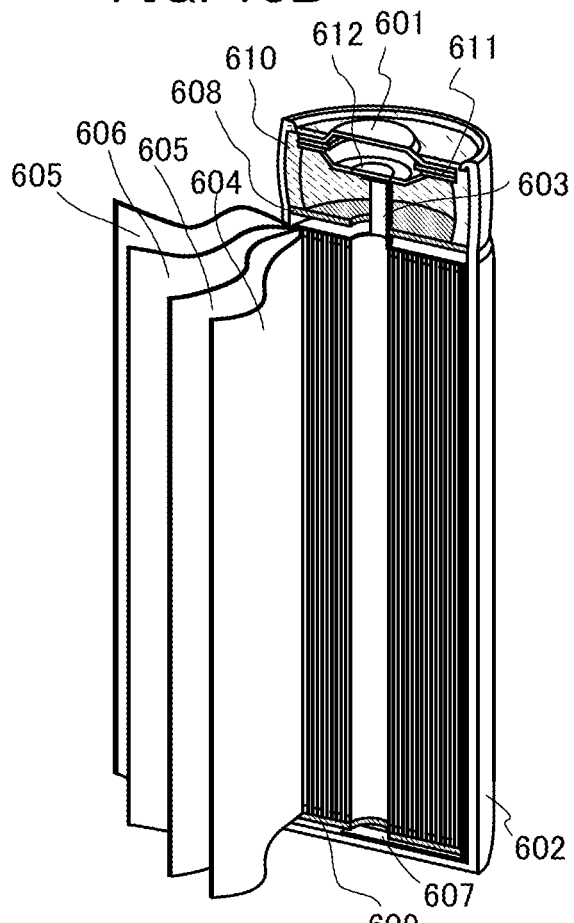

Next, an example of a cylindrical secondary battery is described with reference to FIG. 18. FIG. 18A shows an external view of a cylindrical secondary battery 600. FIG. 18B is a schematic cross-sectional view of the cylindrical secondary battery 600. The cylindrical secondary battery 600 includes, as illustrated in FIG. 18B, a positive electrode cap (battery lid) 601 on the top surface and a battery can (outer can) 602 on a side surface and a bottom surface. The positive electrode cap and the battery can (outer can) 602 are insulated from each other by a gasket (insulating gasket) 610.

Inside the battery can 602 having a hollow cylindrical shape, a battery element in which a strip-like positive electrode 604 and a strip-like negative electrode 606 are wound with a separator 605 located therebetween is provided. Although not illustrated, the battery element is wound around a center pin. One end of the battery can 602 is close and the other end thereof is open. For the battery can 602, a metal having corrosion resistance to an electrolyte solution, such as nickel, aluminum, or titanium, an alloy of such a metal, or an alloy of such a metal and another metal (e.g., stainless steel) can be used. The battery can 602 is preferably covered with nickel, aluminum, or the like in order to prevent corrosion due to the electrolyte solution. Inside the battery can 602, the battery element in which the positive electrode, the negative electrode, and the separator are wound is provided between a pair of insulating plates 608 and 609 that face each other. A nonaqueous electrolyte solution (not illustrated) is injected inside the battery can 602 provided with the battery element. As the nonaqueous electrolyte solution, a nonaqueous electrolyte solution that is similar to that of the coin-type secondary battery can be used.

Since a positive electrode and a negative electrode that are used for a cylindrical secondary battery are wound, active materials are preferably formed on both surfaces of a current collector. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a PTC element (Positive Temperature Coefficient) 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Barium titanate ($BaTiO_3$)-based semiconductor ceramics or the like can be used for the PTC element.

Figure 18C:
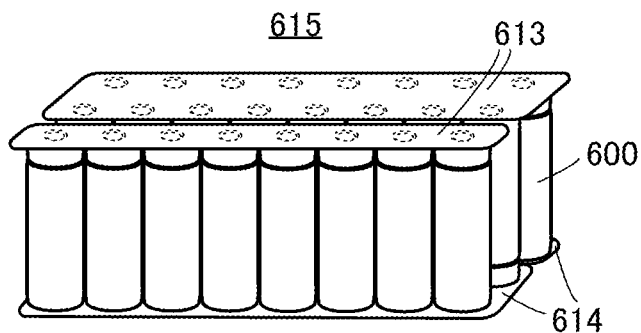

As illustrated in FIG. 18C, a plurality of secondary batteries 600 may be provided between a conductive plate 613 and a conductive plate 614 to form a module 615. The plurality of secondary batteries 600 may be connected in parallel, connected in series, or connected in series after being connected in parallel. With the module 615 including the plurality of secondary batteries 600, large electric power can be extracted.

Figure 18D:
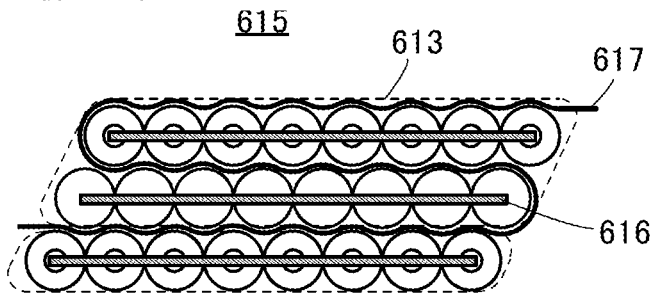

FIG. 18D is a top view of the module 615. The conductive plate 613 is shown by a dotted line for clarity of the diagram. As illustrated in FIG. 18D, the module 615 may include a wiring 616 electrically connecting the plurality of secondary batteries 600 with each other. It is possible to provide the conductive plate over the wiring 616 to overlap with each other. In addition, a temperature control device 617 may be provided between the plurality of secondary batteries 600. The secondary batteries 600 can be cooled with the temperature control device 617 when overheated, whereas the secondary batteries 600 can be heated with the temperature control device 617 when cooled too much. Thus, the performance of the module 615 is unlikely to be affected by the outside temperature. A heating medium included in the temperature control device 617 preferably has an insulating property and incombustibility.

When the positive electrode active material described in the above embodiment is used in the positive electrode 604, the cylindrical secondary battery 600 with high charge and discharge capacity and excellent cycle performance can be obtained.

Embodiment 9

This embodiment describes examples in which the storage battery management system of one embodiment of the present invention is incorporated in a moving object such as a vehicle.

The use of secondary batteries in vehicles enables production of next-generation clean energy vehicles such as hybrid electric vehicles (HVs), electric vehicles (EVs), or plug-in hybrid electric vehicles (PHVs). The secondary battery can also be incorporated in agricultural machines, motorized bicycles including motor-assisted bicycles, motorcycles, electric wheelchairs, electric carts, boats and ships, submarines, aircraft such as fixed-wing aircraft and rotary-wing aircraft, rockets, artificial satellites, space probes, planetary probes, and spacecraft. The secondary battery of one embodiment of the present invention can be a secondary battery with high capacity. Thus, the secondary battery of one embodiment of the present invention is suitable for reduction in size and reduction in weight and is preferably used in transport vehicles.

FIG. 19 illustrates examples of moving objects such as vehicles using the storage battery management system which is one embodiment of the present invention. An automobile 8400 illustrated in FIG. 19A is an electric vehicle that runs on an electric motor as a power source. Alternatively, the automobile 8400 is a hybrid electric vehicle that can appropriately select an electric motor or an engine as a driving power source. With one embodiment of the present invention, the maximal use of the secondary battery to be mounted becomes possible, and a high-mileage vehicle can be achieved. The automobile 8400 includes the secondary battery. The secondary battery can be used not only for driving an electric motor 8406, but also for supplying electric power to a light-emitting device such as a headlight 8401 or a room light (not illustrated).

The secondary battery can also supply electric power to a display device included in the automobile 8400, such as a speedometer or a tachometer. Furthermore, the secondary battery can supply electric power to a semiconductor device included in the automobile 8400, such as a navigation system.

Figure 19A:
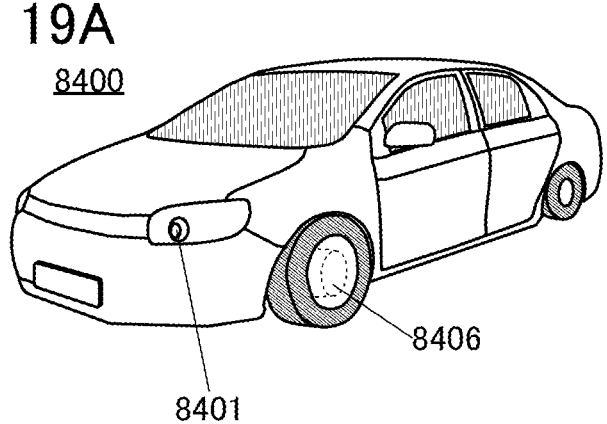
FIG. 19A to FIG. 19D are diagrams illustrating vehicles of one embodiment of the present invention.
Figure 19B:
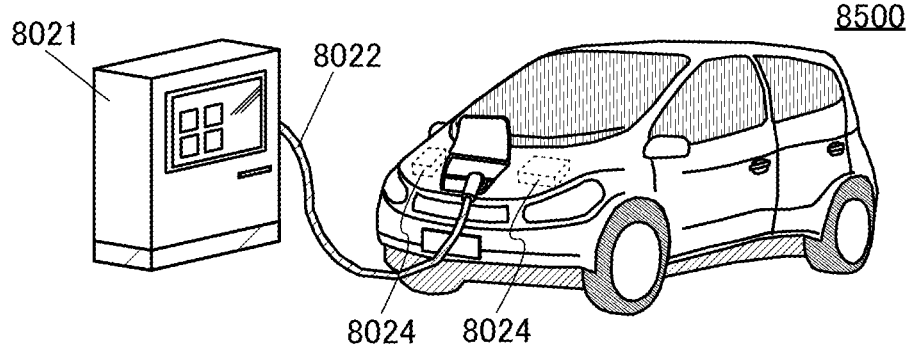

An automobile 8500 illustrated in FIG. 19B can be charged when a secondary battery included in the automobile 8500 is supplied with electric power from external charging equipment by a plug-in system, a contactless power feeding system, or the like. FIG. 19B illustrates a state where a secondary battery 8024 included in the automobile 8500 is charged with the use of a ground-based charging apparatus 8021 through a cable 8022. Charging can be performed as appropriate by a given method such as CHAdeMO (registered trademark) or Combined Charging System as a charging method, the standard of a connector, or the like. The charging apparatus 8021 may be a charging station provided in a commerce facility or a power source in a house. For example, with the use of a plug-in technique, the secondary battery 8024 included in the automobile 8500 can be charged by being supplied with electric power from outside. Charging can be performed by converting AC power into DC power through a converter such as an ACDC converter.

Although not illustrated, the vehicle can include a power receiving device so as to be charged by being supplied with electric power from an above-ground power transmitting device in a contactless manner. In the case of the contactless power feeding system, by fitting a power transmitting device in a road or an exterior wall, charging can be performed not only when the vehicle is stopped but also when driven. In addition, the contactless power feeding system may be utilized to perform transmission and reception of electric power between vehicles. Furthermore, a solar cell may be provided in the exterior of the vehicle to charge the secondary battery when the vehicle stops and moves. To supply electric power in such a contactless manner, an electromagnetic induction method or a magnetic resonance method can be used.

Figure 19C:
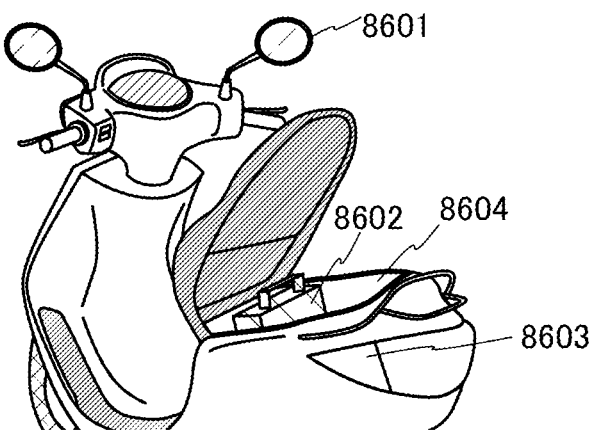

FIG. 19C is an example of a two-wheeled vehicle using the storage battery management system of one embodiment of the present invention. A motor scooter 8600 illustrated in FIG. 19C includes a secondary battery 8602, side mirrors 8601, and direction indicators 8603. The secondary battery 8602 can supply electric power to the direction indicators 8603.

In the motor scooter 8600 illustrated in FIG. 19C, the secondary battery 8602 can be held in an under-seat storage 8604. The secondary battery 8602 can be held in the under-seat storage 8604 even when the under-seat storage 8604 is small. The secondary battery 8602 is detachable; thus, the secondary battery 8602 is carried indoors when charged, and is stored before the motor scooter is driven.

Figure 19D:
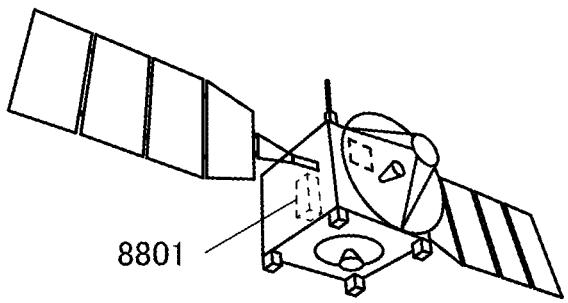

FIG. 19D illustrates an example of an artificial satellite using a storage battery management system of one embodiment of the present invention. An artificial satellite 8800 illustrated in FIG. 19D includes a secondary battery 8801. Because the artificial satellite 8800 is used in an ultra-low-temperature cosmic space, the secondary battery 8801 is desirably covered with a heat-retaining member to be mounted inside the artificial satellite 8800.

According to one embodiment of the present invention, the secondary battery can have improved cycle performance and the charge/discharge capacity of the secondary battery can be increased. Thus, the secondary battery itself can be made more compact and lightweight. The compact and lightweight secondary battery contributes to a reduction in the weight of a vehicle, and thus increases the mileage. Furthermore, the secondary battery included in the vehicle can be used as a power source for supplying electric power to products other than the vehicle. In this case, the use of a commercial power supply can be avoided at peak time of electric power demand, for example. Avoiding the use of a commercial power supply at peak time of electric power demand can contribute to energy saving and a reduction in carbon dioxide emissions. Moreover, the secondary battery with excellent cycle performance can be used over a long period: thus, the use amount of rare metals typified by cobalt can be reduced.

This embodiment can be implemented in appropriate combination with the other embodiments.

REFERENCE NUMERALS

1: server device, 2: charger, 3: vehicle, 4: storage battery pack, 5: power receiving connector, 7: communication network, 11: data, 41: secondary battery, 42: power control unit, 43: driving motor, 44: battery cell, 45: balancing circuit, 46: resistor, 47: circuit, 50: vehicle control unit, 51: CPU, 52: memory portion, 53: communication portion, 60: protection circuit, 61: current monitor circuit, 62: voltage monitor circuit, 63: temperature monitor circuit, 64: path blocking circuit, 71: start switch

The invention claimed is:

1. A storage battery management system comprising a server device and a vehicle, wherein the vehicle comprises:
    a storage battery comprising an assembled battery comprising a plurality of battery cells;
    a balancing circuit electrically connected to the plurality of battery cells; and
    a vehicle control unit comprising a CPU and a communication portion,
    wherein the server device is configured to receive first data on internal states of the plurality of battery cells transmitted from the communication portion, calculate a plurality of estimated values in accordance with the first data, and transmit second data including the plurality of estimated values to the communication portion,
    wherein the CPU is configured to select an estimated value that shows a state of each of the plurality of battery cells from the plurality of estimated values, and
    wherein the balancing circuit is configured to equalize SOC of the plurality of battery cells in accordance with the selected estimated value.

2. A storage battery management system comprising a server device and a vehicle,
    wherein the vehicle comprises:
        a storage battery comprising an assembled battery comprising a plurality of battery cells;
        a balancing circuit comprising a plurality of circuits, the plurality of circuits electrically connected to the plurality of battery cells; and
        a vehicle control unit comprising a CPU and a communication portion,
    wherein the server device is configured to calculate a plurality of estimated values in accordance with first data on an internal state of the assembled battery that is transmitted from the communication portion and transmit second data including the plurality of estimated values to the communication portion,
    wherein the CPU is configured to select an estimated value that shows a state of each of the plurality of battery cells from the plurality of estimated values, and
    wherein the balancing circuit is configured to be controlled equalize SOC of the plurality of battery cells in accordance with the selected estimated value.

3. The storage battery management system according to claim 2, wherein the first data comprises successive data on the internal state of the assembled battery.

4. The storage battery management system according to claim 3, wherein the successive data comprises an SOC-OCV characteristic.

5. The storage battery management system according to claim 3, wherein the successive data comprises internal resistance.

6. The storage battery management system according to claim 5,
    wherein the internal resistance comprises a resistance component R1 with a first response speed and a resistance component R2 with a second response speed, and
    wherein the first response speed is faster than the second response speed.

7. The storage battery management system according to claim 6, wherein the server device is configured to predict changes in the resistance component R1 and the resistance component R2 with LSTM (Long Short-Term Memory).

8. A vehicle comprising:
    a storage battery comprising an assembled battery comprising a plurality of battery cells;
    a balancing circuit comprising a plurality of circuits, the plurality of circuits electrically connected to the plurality of battery cells; and
    a vehicle control unit comprising a CPU and a communication portion,
    wherein the communication portion is configured to transmit first data on internal states of the plurality of battery cells to a server device and receive second data including a plurality of estimated values from the server device,
    wherein the CPU is configured to select an estimated value that shows a state of each of the plurality of battery cells from the plurality of estimated values, and
    wherein the balancing circuit is configured to equalize SOC of the plurality of battery cells in accordance with the selected estimated value.

9. The vehicle according to claim 8, wherein the first data comprises successive data on an internal state of the assembled battery that is transmitted from the vehicle.

10. The vehicle according to claim 9, wherein the successive data comprises an SOC-OCV characteristic.

11. The vehicle according to claim 9, wherein the successive data comprises internal resistance.

12. The vehicle according to claim 11,
    wherein the internal resistance comprises a resistance component R1 with a first response speed and a resistance component R2 with a second response speed, and
    wherein the first response speed is faster than the second response speed.

13. The vehicle according to claim 11, wherein the internal resistance comprises a measured value of each of the plurality of battery cells.

14. The vehicle according to claim 11 configured to measure the internal resistance by a current-rest-method.

15. The storage battery management system according to claim 1, wherein the first data comprises successive data on an internal state of the assembled battery.

16. The storage battery management system according to claim 15, wherein the successive data comprises an SOC-OCV characteristic.

17. The storage battery management system according to claim 15, wherein the successive data comprises internal resistance.

18. The storage battery management system according to claim 17,
   wherein the internal resistance comprises a resistance component R1 with a first response speed and a resistance component R2 with a second response speed, and
   wherein the first response speed is faster than the second response speed.

19. The storage battery management system according to claim 18, wherein the server device is configured to predict changes in the resistance component R1 and the resistance component R2 with LSTM.

* * * * *